US010873471B1

(12) United States Patent
Johnson et al.

(10) Patent No.: US 10,873,471 B1
(45) Date of Patent: Dec. 22, 2020

(54) MEASURING AN AREA OF INTEREST BASED ON A SENSOR TASK

(71) Applicant: Utah State University Research Foundation, North Logan, UT (US)

(72) Inventors: Troy R. Johnson, North Logan, UT (US); Jonathan R. Haws, Richmond, UT (US); Nathan A. Jensen, Preston, ID (US)

(73) Assignee: Utah State University Space Dynamics Laboratory, North Logan, UT (US)

( * ) Notice: Subject to any disclaimer, the term of this patent is extended or adjusted under 35 U.S.C. 154(b) by 0 days.

(21) Appl. No.: 16/694,684

(22) Filed: Nov. 25, 2019

Related U.S. Application Data

(63) Continuation-in-part of application No. 16/039,574, filed on Jul. 19, 2018, now Pat. No. 10,488,508, which is a continuation-in-part of application No. 15/290,725, filed on Oct. 11, 2016, now abandoned.

(51) Int. Cl.
*H04L 12/00* (2006.01)
*H04L 12/753* (2013.01)
*H04L 12/755* (2013.01)
*G16Y 40/10* (2020.01)
*G16Y 40/60* (2020.01)
*H04L 12/733* (2013.01)

(52) U.S. Cl.
CPC .............. *H04L 12/00* (2013.01); *G16Y 40/10* (2020.01); *G16Y 40/60* (2020.01); *H04L 45/021* (2013.01); *H04L 45/126* (2013.01); *H04L 45/48* (2013.01)

(58) Field of Classification Search
CPC ....... H04L 12/00; H04L 45/48; H04L 45/126; H04L 45/021; G16Y 40/10; G16Y 40/60
See application file for complete search history.

(56) References Cited

U.S. PATENT DOCUMENTS

2009/0062936 A1  3/2009  Nguyen et al.
2017/0131716 A1  5/2017  Brekke et al.

OTHER PUBLICATIONS

Dale Linne Von Berg et al., "Multisensor airborne imagery collection and processing onboard small unmanned systems", Apr. 24, 2010, pp. 1-28.
Thomas J. Walls et al., "Scalable sensor management for automated fusion and tactical reconnaissance", Nov. 2, 2017, pp. 1-19.
Masahiko Nagai et al., "UAV-Based Sensor Web Monitoring System", International Journal of Navigation and Observation, vol. 2012, Article ID 858792, Jan. 12, 2012, pp. 1-7.

*Primary Examiner* — Ajay Ojha

(57) ABSTRACT

For measuring an area of interest based on a sensor task and/or routing sensor data, a method discovers a network topology for a network comprising a plurality of network nodes connected by links. The method dynamically generates a minimum spanning tree from the network topology. Given sensor data traverses one link of the minimum spanning tree only once. The method routes a sensor task to a sensor with a sensor motion track that includes an area of interest. The method measures the area of interest with the sensor based on the sensor task. The method routes sensor data from the measurement of the area of interest via links of the minimum spanning tree.

20 Claims, 37 Drawing Sheets

220

| Data Index 222 |
| --- |
| Measurement Coordinates 224 |
| Measurement Error 226 |
| Sensor Measurement 228 |
| Sensor Position 230 |
| Measurement Distance 232 |
| Sensor Type 234 |
| Time Stamp 238 |
| Node Identifier 206 |
| Detection 356 |

170

| Target Identifier 242 |
| Target Geometry 244 |
| Target Location 246 |
| Target Type 248 |
| Target Characteristics 250 |

140

| Sensor Task Identifier |
| 260 |
| Node Identifier |
| 206 |
| Sensor Identifier |
| 272 |
| Sensor Type |
| 234 |
| Area of Interest |
| 262 |
| Time of Interest |
| 274 |
| Sensor Motion Track |
| 264 |
| Voice Command |
| 266 |
| Text Command |
| 268 |
| Sensor Command |
| 270 |

113

192

| Path Identifier 306 |
| Path Description 308 |
| Path Loss Level 316 |
| Path Type 310 |
| Path Data Rate 312 |
| Path Priority 314 |
| Link Identifier 282a |
| Link Identifier 282a |

330

| Distance Score |
| :---: |
| 332 |
| Time Score |
| 334 |
| Slant Angle Score |
| 336 |
| Moving Score |
| 338 |
| User Priority Score |
| 340 |
| Agent Priority Score |
| 344 |
| Detection Priority Score |
| 346 |
| Altitude Score |
| 348 |
| Time Critical Score |
| 350 |

471 

```
┌─────────────────────────┐
│     Dynamic Vector      │
│           481           │
├─────────────────────────┤
│    Vector Probability   │
│           483           │
├─────────────────────────┤
│    Vector Start Time    │
│           485           │
└─────────────────────────┘
```

⋮

```
┌─────────────────────────┐
│     Dynamic Vector      │
│           481           │
├─────────────────────────┤
│    Vector Probability   │
│           483           │
├─────────────────────────┤
│    Vector Start Time    │
│           485           │
└─────────────────────────┘
```

FIG. 6D

MEASURING AN AREA OF INTEREST BASED ON A SENSOR TASK

CROSS-REFERENCE TO RELATED APPLICATIONS

This is a continuation-in-part application of and claims priority to U.S. patent application Ser. No. 16/039,574 entitled "MEASURING AN AREA OF INTEREST BASED ON A SENSOR TASK" and filed on Jul. 19, 2018, which is incorporated herein by reference, which claims priority to U.S. patent application Ser. No. 15/290,725, entitled "MEASURING AN AREA OF INTEREST BASED ON A SENSOR TASK," filed on Oct. 11, 2016, which is incorporated herein by reference.

GOVERNMENT RIGHTS

This invention was made with government support under contract No. N00173-12-D-2004 by the Naval Research Laboratory. The government has certain rights in the invention.

FIELD

The subject matter disclosed herein relates to a sensor data and more particularly relates to routing sensor data.

BACKGROUND

Description of the Related Art

Information management systems in the field must often route sensor data over bandwidth constrained networks.

BRIEF SUMMARY

A method for measuring an area of interest based on a sensor task and/or routing sensor data is disclosed. The method discovers a network topology for a network comprising a plurality of network nodes connected by links. The method dynamically generates a minimum spanning tree from the network topology. A given sensor data traverses one link of the minimum spanning tree only once. The method routes a sensor task to a sensor with a sensor motion track that comprises an area of interest. In addition, the method measures the area of interest with the sensor based on the sensor task. The method routes sensor data from the measurement of the area of interest via links of the minimum spanning tree. An apparatus and computer program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6D is a schematic block diagram illustrating one embodiment of a temporal/spatial vector;

DETAILED DESCRIPTION

Figure 1A:
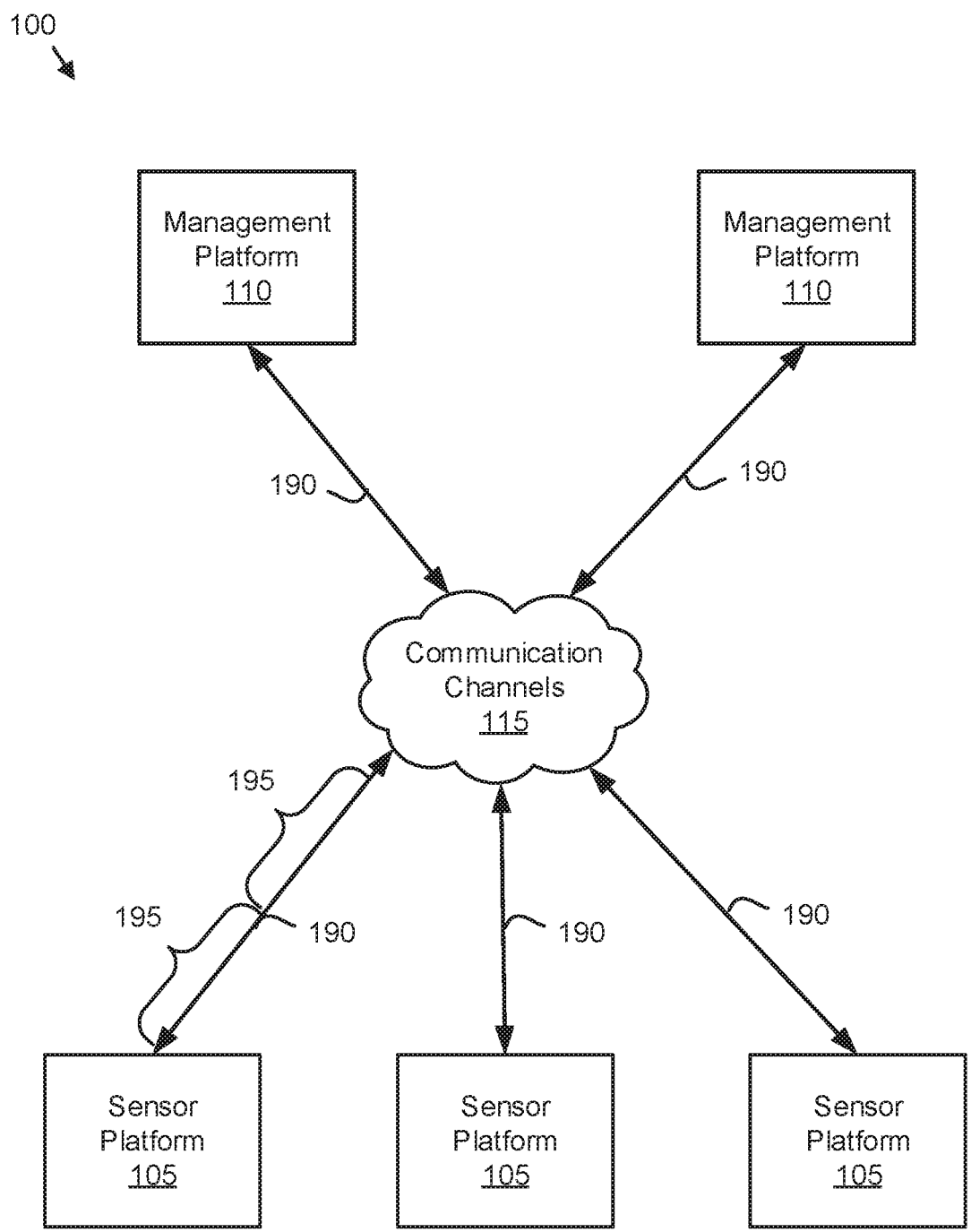
FIG. 1A is a schematic block diagram illustrating one embodiment of a sensor management system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom Very Large Scale Integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory and/or processing devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Python, Ruby, R, Java, Java Script, Smalltalk, C++, C sharp, Lisp, Clojure, PHP, or the like and conventional procedural programming languages, such as the "C" programming language or similar programming languages, and hardware definition languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" or "or" indicates embodiments of one or more of the listed elements, with "A and/or B" or "A or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a sensor management system 100. In the depicted embodiment, the system 100 includes one or more management platforms 110, one or more sensor platforms 105, and one or more communication channels 115. The management platforms 110 and the sensor platforms 105 may communicate over paths 190 through the communication channels 115.

A sensor platform 105 may be disposed on an aircraft, a drone, a vehicle, a satellite, a ground station, or the like. The sensor platform 105 may include one or more sensors as will be described hereafter. The sensors may record sensor data on a physical space. The physical space may be a survey area. The sensor data may be used to find and identify targets or items of interest such as rescue targets and/or coordinate a survey.

A management platform 110 and/or a sensor platform 105 may process the sensor data to generate reconnaissance, surveillance, intelligence, and/or tactical information. In addition, decisions may be made based on the processed sensor data.

Combinations of management platforms 110 and sensor platforms 105 may communicate over paths 190 through the communication channels 115. Each path 190 may include one or more links 195. The links 195 may include wireless links, fiber-optic links, laser-based links, acoustic links, and the like.

In the past, sensor platforms 105 gathered sensor data that was transmitted to a dedicated management platform 110. The management platform 110 analyzed the sensor data. If the analysis identified an area of the physical space that warranted further investigation, manual instructions were generated for pilots and/or observers to gather additional data. Unfortunately, the delays introduced by the manual analysis and issuance of instructions often meant that a sensor platform 105 was no longer in the area to gather the additional data. In addition, important sensor data and resulting data products was only slowly disseminated through various management systems to users.

The embodiments described herein control sensor data collection by a wide variety of disparate sensors on the sensor platforms 105. The embodiments of the system 100 employ a plurality of computers and agents executing on the computers to generate sensor tasks and route the sensor tasks to appropriate sensors. As a result, the system 100 may more rapidly direct sensors to measure an area of interest, improving the value of the aggregate sensor data gathered.

In addition, the sensor management system 100 may support dynamically changing allocations of sensor platforms 105, communication channels 115, and management platforms 110. As a result, the system 100 may seamlessly manage sensor data collection and analysis for the physical space.

Figure 1B:
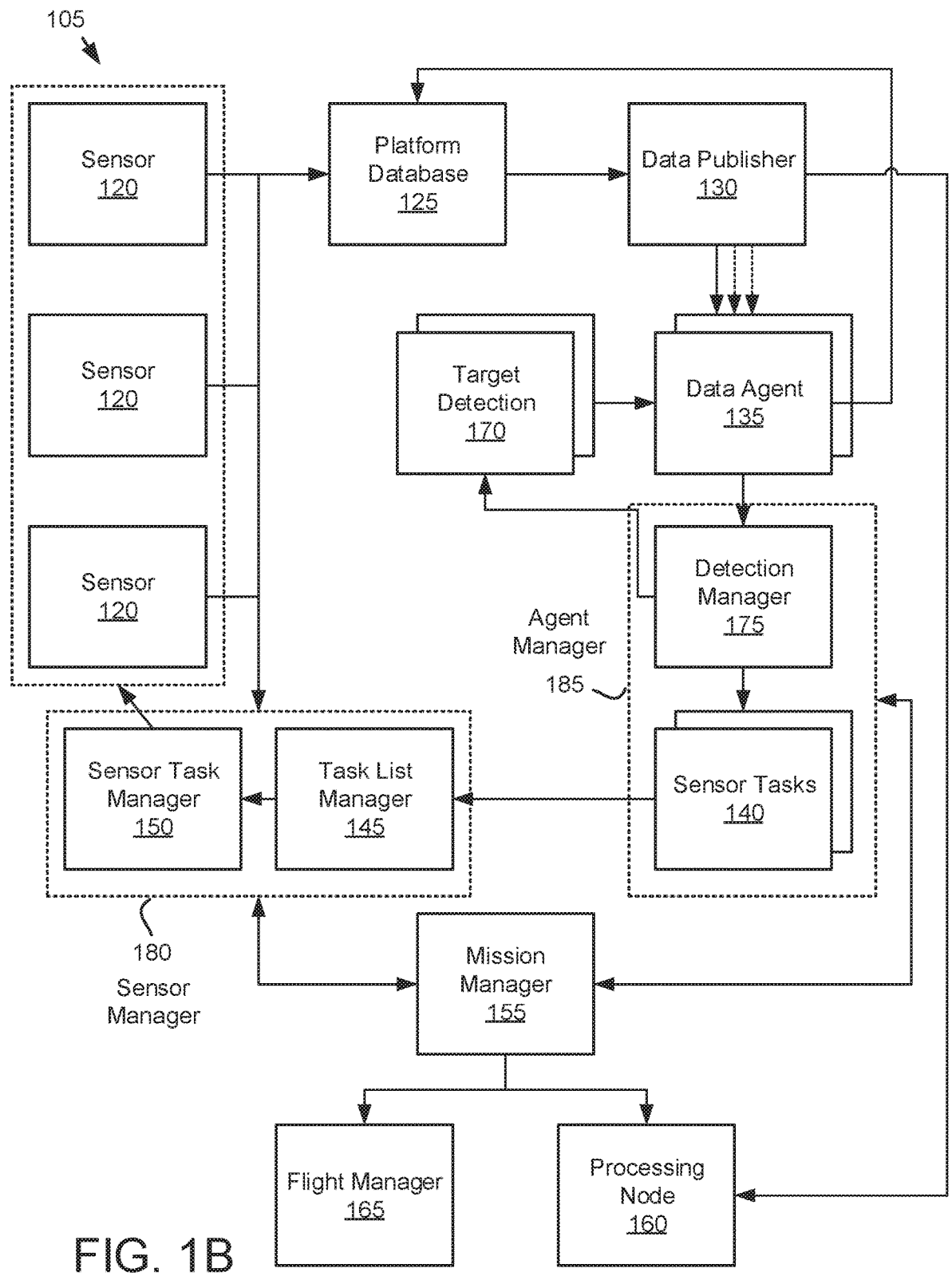
FIG. 1B is a schematic block diagram illustrating one embodiment of a sensor platform.

FIG. 1B is a schematic block diagram illustrating one embodiment of a sensor platform 105. In the depicted embodiment, the sensor platform 105 includes one or more sensors 120, a platform database 125, a data publisher 130, one or more data agents 135, an agent manager 185, one or more target detections 170, a sensor manager 180, a mission manager 155, a flight manager 165, and a processing node 160. The agent manager 185 may include a detection manager 175 and one or more sensor tasks 140. The sensor manager 180 may include a task-list manager 145 and a sensor task manager 150. The sensors 120, platform database 125, data publisher 130, data agents 135, agent manager 185, detection manager 175, sensor tasks 140, target detections 170, sensor manager 180, task list manager 145, sensor task manager 150, mission manager 155, and flight manager 165 may each be organized as one or more data structures and/or routines of code stored in one or more memories and executed by one or more processors of one or more processing nodes 160.

The sensors 120 may include radar sensors, optical sensors, lidar sensors, thermal imaging sensors, and the like. In response to a sensor task, a sensor 120 may collect sensor data and store the sensor data in the platform database 125 as platform data. The data publisher 130 may establish a publish/subscribe relationship with the platform data in the platform database 125. In one embodiment, the data publisher 130 may establish the publish/subscribe relationship in response to a request from a data agent 135.

In one embodiment, the sensors 120 communicate with the sensor platform 105 through one or more standardized physical and software sockets. The sensors 120 may communicate with the sensor platform 105 through one or more standardized physical and software sockets.

The detection manager 175 may request the publish/subscribe relationship. Alternatively, the agent 135 may request the publish/subscribe relationship in response to a target detection 170. The agent manager 185 may manage the routing of platform data to the data agents 135. In addition, the agent manager 185 may manage the generation of sensor tasks 140.

A data agent 135 may be an interactive software application that is used by a user to view data and/or send commands to the system 100. Alternatively, the data agent 135 may run autonomously and request platform data 220, process platform data 220, and autonomously generate sensor tasks 140. The data agent 135 may receive published platform data from the publish/subscribe relationship. In response to the target detection 170 and platform data, the data agent 135 may correlate the target detection 170 to the platform data. The data agent 135 may further determine an area of interest.

The data agent 135 may communicate the area of interest to the detection manager 175. The detection manager 175 may determine if the area of interest warrants the generation of a sensor task 140. The detection manager 175 may employ one or more algorithms for determining if an area of interest identified by a data agent 135 should be the objective of a sensor task 140.

If the detection manager determines that the area of interest should be the object of a sensor task 140, the detection manager 175 may determine if a sensor 120 of a specified sensor type is available for the area of interest. The detection manager 175 may direct the data agent 135 to generate a sensor task 140 as a function of the area of interest and sensor availability of the sensor 120. Alternatively, a data agent 135 may autonomously generate the sensor task 140.

The sensor task 140 may be received by the task list manager 145. The task-list manager 145 may schedule a sensor 120 to measure the area of interest. The sensor 120 may be on another sensor platform 105. A sensor task manager 150 may direct the sensor 120 to measure the area of interest. The sensor data from the area of interest is then added to the platform database 125.

The mission manager 155 may communicate one or more algorithms and/or priorities to the agent manager 185 and the sensor manager 180. The algorithms and priorities may be used by the agent manager 185 and the sensor manager 180 to select sensor tasks 140 for areas of interest and to schedule the sensor tasks 140 on a sensor 120. The sensor task manager 150 may schedule the sensor task 140 on a sensor 120 of the sensor platform 105. In addition, the sensor tasks 140 may be scheduled by the sensor task manager 150 through the mission manager 155 on sensors 120 of another sensor platform 105.

In one embodiment, the mission manager 155 and/or sensor task manager 150 may modify a sensor motion track for the sensor 120. In addition, the mission manager 155 and/or sensor task manager 150 may modify the motion track for the sensor platform 105. The mission manager 155 may direct the flight manager 165 to modify a motion track of the sensor platform 105 for the sensor 120. For example, the mission manager 155 may direct the flight manager 165 to automatically modify the motion track of a drone sensor platform 105. Alternatively, modifying the sensor motion track may a comprise issuing movement directions to an observer.

Figure 1C:
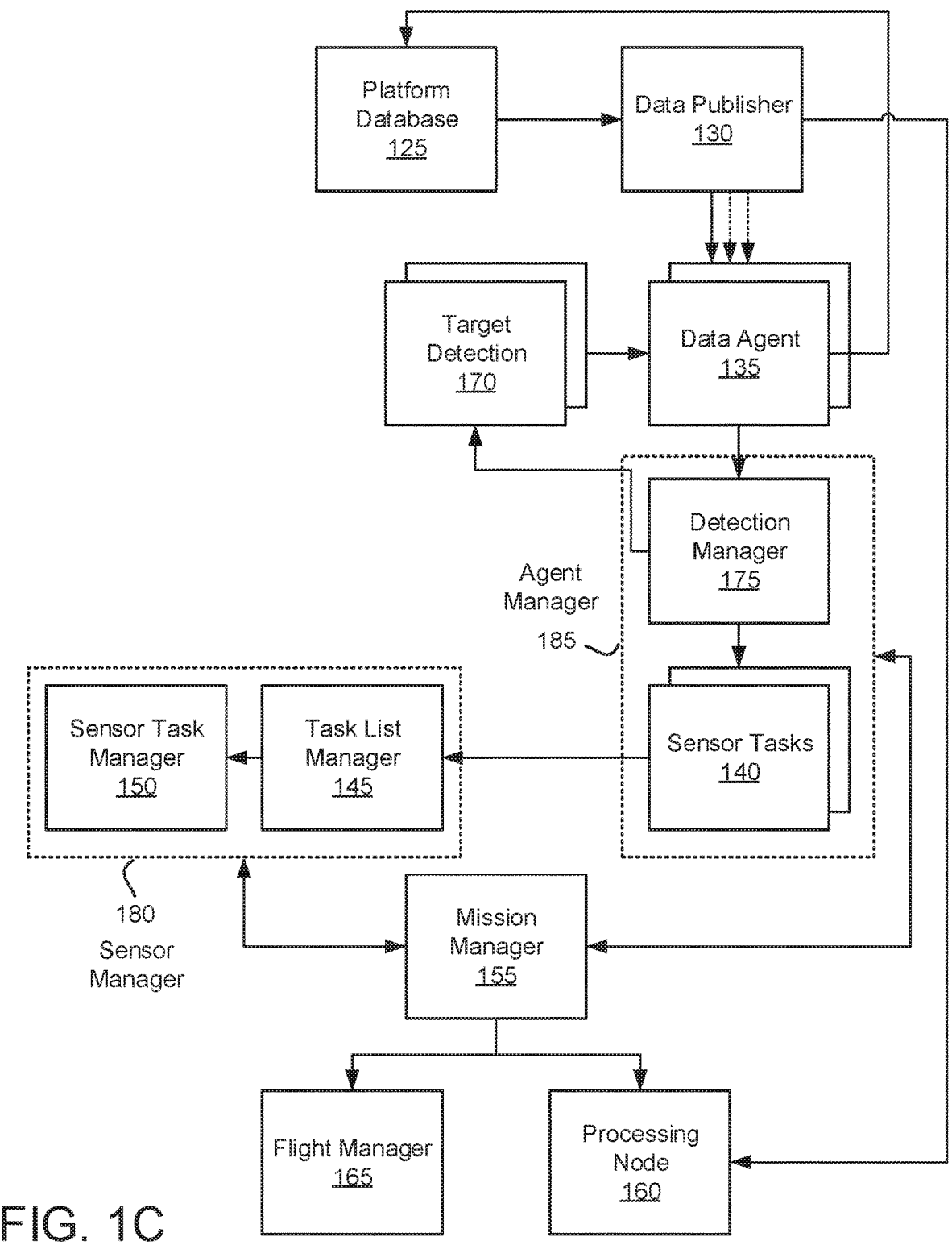
FIG. 1C is a schematic block diagram illustrating one embodiment of a management platform.

FIG. 1C is a schematic block diagram illustrating one embodiment of a management platform 110. In the depicted embodiment, the management platform 110 includes the platform database 125, the data publisher 130, the one or more data agents 135, the agent manager 185, the one or more target detections 170, the sensor manager 180, the mission manager 155, the flight manager 165, and the processing node 160 as described for FIG. 1B. The management platform 110 may generate sensor tasks 140 using platform data transmitted to the platform database 125 from other management platforms 110 and/or sensor platforms 105. The sensor tasks 140 may be scheduled by the sensor task manager 150 through the mission manager 155 on sensors 120 of a sensor platform 105.

Figure 2A:
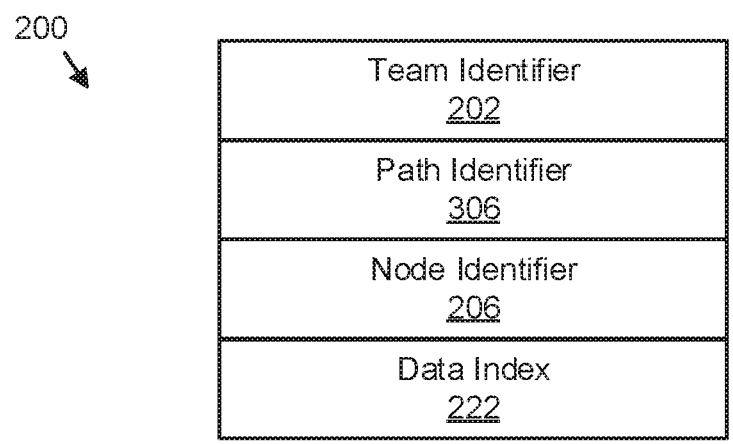
FIG. 2A is a schematic block diagram illustrating one embodiment of team connection.

FIG. 2A is a schematic block diagram illustrating one embodiment of team connection 200. The team connection 200 may be organized as a data structure in a memory. In the depicted embodiment, the team connection 200 includes a team identifier 202, a path identifier 306, a node identifier 206, and a data index 222.

The team identifier 202 may uniquely identify a team connection between one or more management platforms 110 and/or sensor platforms 105. The team connection may be organized to share platform data and/or sensor tasks 140 among the one or more management platforms 110 and sensor platforms 105. The team identifier 202 may be an alphanumeric string.

The path identifier 306 may uniquely describe one or more paths 190 as will be described hereafter in FIG. 3C. The path 190 may be used by the team connection to share platform data and/or sensor tasks 140 among the one or more management platforms 110 and sensor platforms 105.

The node identifier 206 may identify each management platform 110 and/or sensor platform 105 in the team connection. The data index 222 may identify shared platform data for the team connection. In one embodiment, the data index 222 may include pointers to platform data on one or more management platforms 110 and sensor platforms 105.

Figure 2B:
FIG. 2B is a schematic block diagram illustrating one embodiment of platform data.

FIG. 2B is a schematic block diagram illustrating one embodiment of the platform data 220. The platform data 220 may be organized as a data structure in a memory. In the depicted embodiment, the platform data 220 includes a data index 222, measurement coordinates 224, a measurement error 226, a sensor measurement 228, a sensor position 230, a measurement distance 232, a sensor type 234, a timestamp 238, a node identifier 206, and a detection 256.

The data index 222 may identify the platform data 220 within one or more platform databases 125. The measurement coordinates 224 may identify a portion of the physical space for which the sensor measurement 228 was recorded. The measurement error 226 may record an estimated error band for the sensor measurement 228.

The sensor measurement 228 may include a measurement value for the measurement coordinates 224. Alternatively, the sensor measurement 228 may include a measurement matrix for the measurement coordinates 224. The sensor measurement 228 may include radar measurements, lidar measurements, optical measurements, infrared measurements, laser measurements, or combinations thereof.

The sensor position 230 may record a position and orientation of the sensor 120 within the physical space when the sensor measurement 228 was recorded. The measurement distance 232 may record a distance from the sensor position 230 to the measurement coordinates 224.

The sensor type 234 may identify a type of the sensor 120 that recorded the sensor measurement 228. For example, the sensor type 234 may specify one of a radar sensor, a thermal imaging sensor, a lidar sensor, an optical sensor, or the like. In addition, the sensor type 224 may specify one or more of an aperture size for the sensor 120, a sensitivity of the sensor 120, calibration data for the sensor 120, ambient conditions of the sensor 120, and the like.

The timestamp 238 may indicate when the platform data 220 was recorded as sensor data. The node identifier 206 may identify the sensor platform 105 upon which the sensor 120 that recorded the platform data 220 is disposed.

The detection 356 may identify a portion of the sensor measurement that satisfies one or more detection algorithms. For example, a detection 356 may be recorded in response to detecting metal, detecting movement, detecting an electromagnetic signal source, and the like.

Figure 2C:
FIG. 2C is a schematic block diagram illustrating one embodiment of a target detection.

FIG. 2C is a schematic block diagram illustrating one embodiment of a target detection 170. The target detection 170 maybe organized as a data structure in a memory. In the depicted embodiment, the target detection 170 includes a target identifier 242, a target geometry 244, a target location 246, a target type 248, and target characteristics 250.

The target identifier 242 may uniquely identify a target. The target identifier 242 may be an index number. The target geometry 244 may describe physical dimensions of the target. In one embodiment, the target geometry 244 includes a point cloud. In addition, the target geometry 244 may include one or more polygons such as triangles or squares that describe the outer physical dimensions of the target.

The target location 246 may record a location of the target within the physical space. The target type 248 may record an estimate of a type of the target. For example, the target type 248 may specify that the target is a vehicle and/or that the vehicle is moving or stationary. The target characteristics 250 specifies characteristics that are used to identify the target. The target characteristics 250 may also specify a target type.

Figure 2D:
FIG. 2D is a schematic block diagram illustrating one embodiment of sensor task data.

FIG. 2D is a schematic block diagram illustrating one embodiment of sensor task data 140. The sensor task data 140 maybe organized as a data structure in a memory. In the depicted embodiment, the sensor task data includes a sensor task identifier 260, a node identifier 206, a sensor identifier 272, the sensor type 234, the area of interest 262, a time of interest 274, a sensor motion track 264, a voice command 266, a text command 268, and sensor commands 270.

The sensor task identifier 260 uniquely identifies the sensor task 140. The sensor task identifier 260 may be an index number. The node identifier 206 may specify one or more sensor platforms 105 that may be used for a measurement by a sensor 120. In one embodiment, the node identifier 206 is a null value. The null value may indicate that any sensor platform 105 with the sensor 120 of the sensor type 234 may be used for the measurement.

The sensor identifier 272 may specify a sensor 120 that is to record a measurement. In one embodiment, the sensor identifier 272 specifies a set of sensors 120 that is acceptable for recording the measurement. The sensor identifier 272 may be a null value. The null value may indicate that any sensor 120 of the sensor type 234 may be used for the measurement.

The sensor type 234 may identify a type of the sensor 120 that should be used for the sensor measurement 228. For example, the sensor type 224 may specify one of a radar sensor, a thermal imaging sensor, a lidar sensor, an optical sensor, or the like.

The area of interest 262 specifies the area of interest for the measurement by the sensor 120. The area of interest 262 may be organized as spatial coordinates, spatial coordinates and a radius, a specific vector to spatial coordinates, a specified area, a specified volume, a specified object within an area, and the like. In one embodiment, the area of interest 262 includes an azimuth size measured in degrees, a cross-track direction, an elevation size measured in degrees, a flight track direction, an azimuth offset measured in degrees, and an elevation offset measured in degrees. The area of interest 262 may be organized as spatial coordinates. In one embodiment, the area of interest 262 is organized as dynamic temporal/spatial vectors as will be described hereafter. In a certain embodiment, the area of interest 262 specifies where the sensors 120 should take measurements.

The time of interest 274 may specify a time interval for which measurements of the area of interest 262 are desired. In one embodiment, the time of interest 274 specifies multiple time intervals.

The sensor motion track 264 may specify a track that is followed by the sensor platform 105 when acquiring the measurement. The voice command 266 may record a command that is communicated in audible form to an observer. The observer following the command may move the sensor platform 105 along the sensor motion track 264. The text command 268 may record the command to move the sensor platform 105 along the sensor motion track 264. The text command 268 may be communicated to the observer.

The sensor command 270 directs a sensor 120 to capture the desired measurement such as a measurement of the area of interest 262. The sensor command 270 may specify a duration of the measurement, an angle of the measurement, one or more sensor parameters for the sensor 120, and the like.

Figure 2E:
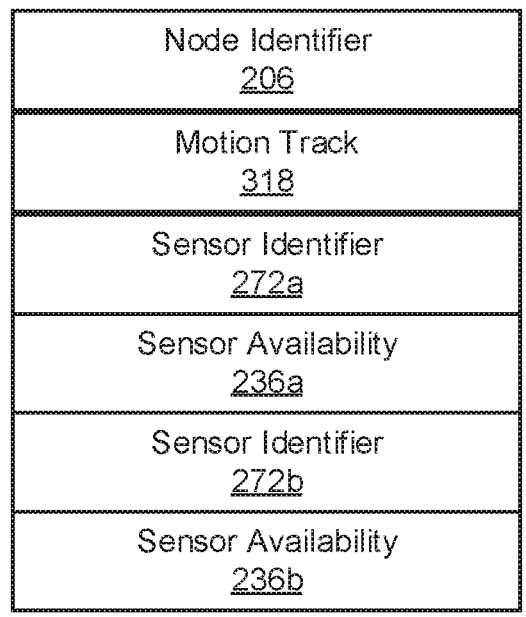
FIG. 2E is a schematic block diagram illustrating one embodiment of sensor platform data.

FIG. 2E is a schematic block diagram illustrating one embodiment of sensor platform data 320. The sensor platform data 320 maybe organized as a data structure in a memory. In the depicted embodiment, the sensor platform data 320 includes a node identifier 206, a motion track 318, and sensor identifiers 272 and sensor availabilities 236 for one or more sensors 120.

The node identifier 206 may uniquely identify a sensor platform 105. The motion track 318 may record a scheduled track for the sensor platform 105. The motion track 318 may include a plurality of points in the physical space. An estimated time that the sensor platform 105 will be at a point may also be associated with each point. Physical and temporal guard bands may be associated with each point. The physical guard band may estimate a three sigma deviation from the motion track point by the sensor platform 105. The temporal guard band may estimate a three sigma deviation from an estimated time that the sensor platform 105 is scheduled to pass through the point.

Each sensor identifier 272 may uniquely identify a sensor 120 on the sensor platform 105. For example, a radar sensor 120 may be assigned the sensor identifier 272 "R124."

The sensor availability 236 may specify one or more time intervals when the corresponding sensor 120 is available for taking measurements. In addition, portions of the physical space that may be accessible by the sensor 120 may also be specified for each time interval. In one embodiment, the portions of the physical space may include coordinates of an area on the ground of the physical space. In addition, the portions of the physical space may specify an altitude range for the sensor platform 105.

Figure 3A:
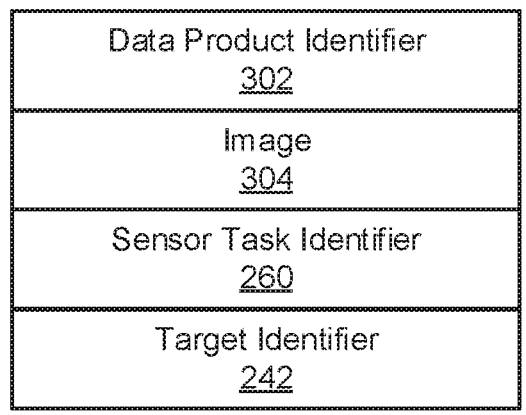
FIG. 3A is a schematic block diagram illustrating one embodiment of a data product.

FIG. 3A is a schematic block diagram illustrating one embodiment of a data product 113. The data product 113 may be organized as a data structure in a memory. In the depicted embodiment, the data product 113 includes a data product identifier 302, an image 304, a sensor task identifier 260, and a target identifier 242.

The data product identifier 302 may uniquely identify the data product 113. The data product identifier 302 may be an index value. The image 304 may comprise one or more of a raw still image of platform data 220, a raw video image of platform data 220, a still image processed from platform data 220, a video image processed from platform data 220, a target identification, and the like. The sensor task identifier 260 may specify one or more sensor tasks 140 that contributed to the generation of the data product 113. The target identifier may specify one or more target detections 170 that contributed to the generation of the data product 113.

Figure 3B:
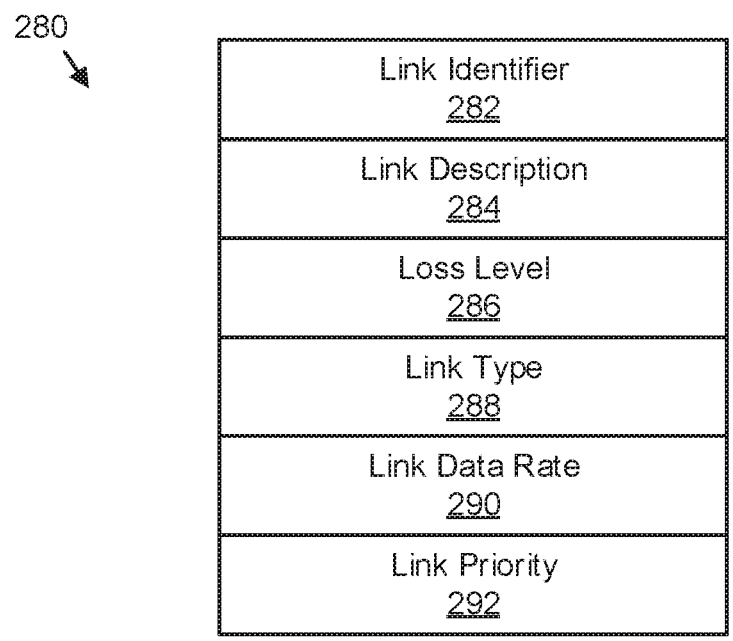
FIG. 3B is a schematic block diagram illustrating one embodiment of link data.

FIG. 3B is a schematic block diagram illustrating one embodiment of link data 280. The link data 280 may describe a link 195 of a path 190. The link data 280 maybe organized as a data structure in a memory. In the depicted embodiment, the link data 280 includes a link identifier 282, a link description 284, a loss level 286, a link type 288, a link data rate 290, and a link priority 292.

The link identifier 282 may uniquely identify a link 195. The link identifier 282 may be an index value. The link description 284 may describe the link 195. For example, a link 195 may be described in the link description 284 as an Institute of Electrical and Electronic Engineers (IEEE) 802 compliant link.

The loss level 286 may characterize a loss level for data that is communicated over the link 195. The loss level 286 may characterize an average loss level. Alternatively, the loss level 286 may characterize a maximum allowable loss level. In one embodiment, the loss level 286 characterizes a worst-case loss level.

The link type 288 may characterize a type of the link 195. The link type 288 may specify an IEEE 802 compliant link. Alternatively, the link type 288 may specify one or more of a radio type, a laser type, an electrical cable type, an optical cable type, and an acoustic type. In addition, the link type 288 may specify whether the link 195 is encrypted. In one embodiment, the link type 288 specifies one or more demodulation schemes.

The link data rate 290 may specify a data rate for data transmitted over the link 195. In one embodiment, the link data rate 290 is an average data rate. Alternatively, the link data rate 290 is a minimum data rate.

The link priority 292 may specify a priority for communications over the link 195 by a path 190. The link priority 292 may be specified by a provider of the link 195.

Figure 3C:
FIG. 3C is a schematic block diagram illustrating one embodiment of path data.

FIG. 3C is a schematic block diagram illustrating one embodiment of path data 192. The path data 192 may describe a path 190. The path data 192 may be organized as a data structure in a memory. In the depicted embodiment, the path data 192 includes a path identifier 306, a path description 308, a path loss level 316, a path type 310, a path data rate 312, a path priority 314, and one or more link identifiers 282.

The path identifier 306 may uniquely identify the path 190. The path identifier 306 may be an index value. The path description 308 may describe the path 190. For example, the path description 308 may be "path to drone three."

The path loss level 316 may characterize a loss level for data that is communicated over the path 190. The path loss level 316 may characterize an average loss level. Alternatively, the path loss level 316 may characterize a maximum allowable loss level. In one embodiment, the path loss level 316 characterizes a worst-case loss level. The path loss level 316 may be calculated from the loss levels 286 of one or more links 195 that comprise the path 190.

The path priority 314 may specify a priority for communications over the path 190. The path priority 314 may be calculated from link priorities 292 of links 195 that comprise the path 190.

The link identifiers 282 may specify one or more links 195 that comprise the path 190. In one embodiment, the link identifiers 282 specify two or more parallel links 195. Only one link of the two or more parallel links 195 may be employed. Alternatively, two or more of the two or more parallel links 195 may be concurrently employed.

Figure 3D:
FIG. 3D is a schematic block diagram illustrating one embodiment of score data.

FIG. 3D is a schematic block diagram illustrating one embodiment of score data 330. The score data 330 maybe organized as a data structure in a memory. In the depicted embodiment, the score data 330 includes a distance score 332, a time score 334, a slant angle score 336, a moving score 338, a user priority score 340, an agent priority score 344, a detection priority score 346, an altitude score 348, and a time critical score 350. The score data 330 may be used to generate a sensor tasks 140 as will be described hereafter.

The distance score 332 may be a function of a distance between a detection in platform data 220 and/or sensor data and a sensor platform 105. In one embodiment, the distance score 332 increases as the distance shortens between the detection and the sensor platform 105. The time score 334 may be a function of a time since the detection was measured. In one embodiment, detections with the most recent timestamp 238 have higher time scores 334.

The slant angle score 336 may be a function of a slant range angle from the sensor platform 105 to the detection. The slant angle score 336 may increase as the slant range angle decreases. The moving score 338 may be a function of movement of the detection. The moving score 338 may increase with movement of the detection.

The user priority score 340 may be assigned by a user and/or administrator. The agent priority score 344 may be calculated by a data agent 135. The agent priority score 344 may be an algorithmic score. The detection priority score 346 may be a function of an agent priority score 334 and a user priority score 340.

The altitude score 348 may be a function of the detection's above ground level. The altitude score 348 increases with the distance of a detection above the ground. The time critical score 350 may be set if information regarding the detection is time critical.

Figure 4:
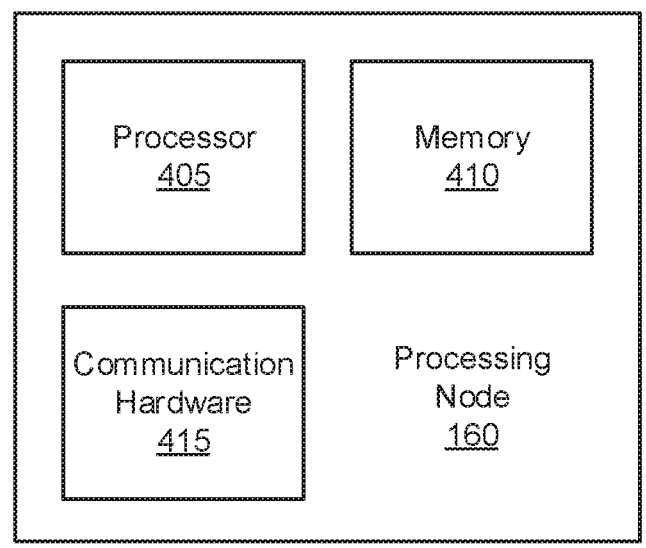
FIG. 4 is a schematic block diagram illustrating one embodiment of a processing node.

FIG. 4 is a schematic block diagram illustrating one embodiment of a processing node 160. One or more processing nodes 160 may be embodied in each sensor platform 105 and management platform 110. In the depicted embodiment, the processing node 160 includes a processor 405, a memory 410, and communication hardware 415. The memory 410 may be a computer readable storage medium such as a semiconductor storage device, a hard disk drive, a holographic storage device, a micromechanical storage device, or the like. The memory 410 may store computer readable program code. The processor 405 may execute the computer readable program code. The communication hardware 415 may communicate with other devices.

Figure 5A:
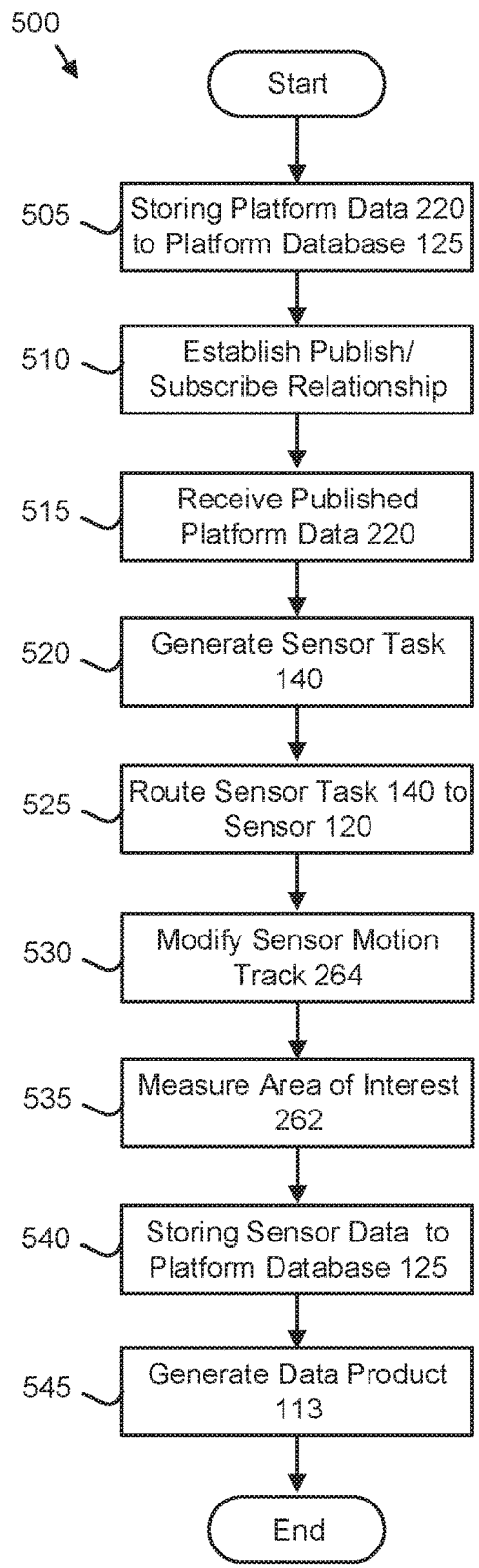
FIG. 5A is a schematic flowchart diagram illustrating one embodiment of an area of interest measurement method.

FIG. 5A is a schematic flowchart diagram illustrating one embodiment of an area of interest measurement method 500. The method 500 may automatically direct a sensor platform 105 and/or sensor 120 to measure an area of interest 262. The method 500 may be performed by one or more processors 405 of one or more processing nodes 160 in the system 100.

The method 500 starts, and in one embodiment, the processor 405 stores 505 platform data 220 to the platform database 125. The platform data 220 may be received from a sensor 120 through an internal bus of a sensor platform 105 or a management platform 110. Alternatively, the platform data 220 may be received from a second platform database 125 of another sensor platform 105 and/or management platform 110. The platform data 220 may be received over a path 190.

The processor 405 may establish 510 a publish/subscribe relationship for platform data 220. The publish/subscribe relationship may be generated by the data publisher 130. In addition, the publish/subscribe relationship may be maintained by the data publisher 130. The publish/subscribe relationship may request specific platform data 220 from the platform database 125 as the platform data 220 becomes available.

The processor 405 may receive 515 published platform data 220. In one embodiment, one or more data agents 135 executing on the processor 405 receive 515 the published platform data 220 from the data publisher 130.

The processor 405 may generate 520 a sensor task 140. The sensor task 140 may include a sensor type 234 and an area of interest 262. In one embodiment, the sensor task 140 is generated as a function of the area of interest 262 and sensor availability 236 of a sensor 120.

In one embodiment, the sensor task 140 is generated 520 for a sensor 120 with a sensor availability 236 that satisfies an availability threshold. In one embodiment, the availability threshold is satisfied if the sensor availability 236 indicates that the sensor 120 is available within the time of interest 274. In addition, the availability threshold may be satisfied if the sensor availability 236 indicates that the sensor 120 may measure the area of interest 262 when the motion track 318 is within the threshold distance of the area of interest 262. Additional embodiments of the generation 520 of the sensor task 140 are described in more detail in FIGS. 5C-D.

The processor 405 may route 525 the sensor task 140 to a sensor 120 of the sensor type 234 and with a sensor motion track 264 that comprises the area of interest 262. Alternatively, the processor 405 may route 525 the sensor task 140 to a sensor 120 of the sensor type 234 regardless of a current sensor motion track 264. In a certain embodiment, the sensor task 140 is routed 525 to the sensor 120 specified by the node identifier 206

In one embodiment, the processor 405 modifies 530 the sensor motion track 264 for the sensor 120. The sensor motion track 264 may be modified 530 to conform to the motion track 318 for the sensor platform 105 that hosts the sensor 120.

In a certain embodiment, the processor 405 modifies 530 the sensor motion track 264 by modifying the motion track 318 for the sensor platform 105 that hosts the sensor 120 to include the area of interest 262. The motion track 318 may be modified 530 to pass within the threshold distance of the area of interest 262.

In a certain embodiment, the motion track 318 is a flight plan. In addition, modifying 530 the sensor motion track 264 may include generating a voice command 266 and/or the text command 268 and issuing movement directions using the voice command 266 and/or the text command 268 to an observer and/or pilot.

The sensor 120 may measure 535 the area of interest 262. The sensor 120 may measure 535 the area of interest 262 as directed by the sensor command 270. In a certain embodiment, the sensor manager 180 communicates the sensor command 272 the sensor 120 and/or the sensor platform 105 and the sensor 120 and/or sensor platform 105 executes the sensor command 272. Alternatively, the sensor manager 180 may directly execute the sensor command 270 by controlling the sensor 120 and/or the sensor platform 105.

The processor 405 may store 540 the sensor data from the measurement two 535 of the area of interest 262 to the platform database 125. The processor 405 may further generate 545 the data product 113 and the method 500 ends. In one embodiment, the processor 405 generates the image 304 from platform data 220. The image 304 may include the sensor data and other platform data 220 identified by the sensor tasks 140 and the target detections 170 used by the agent manager 185 in generating the sensor task 140.

Figure 5B:
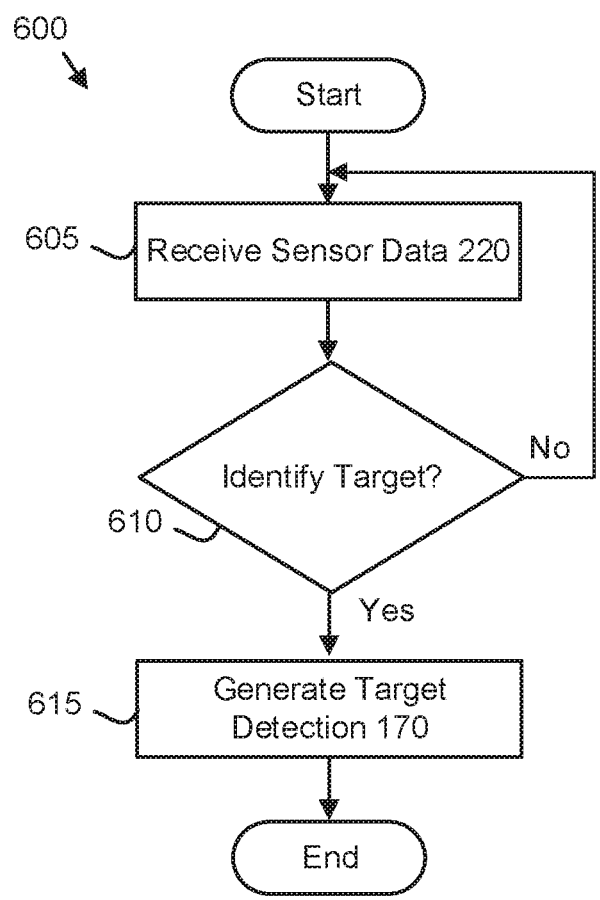
FIG. 5B is a schematic flow chart diagram illustrating one embodiment of a target detection generation method.

FIG. 5B is a schematic flow chart diagram illustrating one embodiment of a target detection generation method 600. The method 600 may automatically generate a target detection 170. The method 600 may be performed by one or more processors 405 of one or more processing nodes 160 in the system 100. In particular, the one or more processors 405 may host the data agents 135 and/or the agent manager 185.

The method 600 starts, and in one embodiment, the processor 405 receives 605 the platform data 220. The platform data 220 may be received in response to a publish/subscribe relationship being satisfied.

The processor 405 may determine 610 if a target is identified. In one embodiment, the target is identified if the target characteristics 250 are satisfied by the platform data 220. If the target is not identified, the processor 405 may continue to receive 605 platform data 220.

In one embodiment, a first data agent 135 may identify a detection 356 from the platform data 220. For example, the first data agent 135 may identify a metal signature from radar platform data 220 as a detection 356. A second data agent may analyze image platform data 220 to determine 610 if the detection 356 is a target. The detection 356 may be identified as a target if the detection 236 satisfies an algorithm such as a vehicle identification or motion algorithm from the target characteristics 250.

If the target is identified, the processor 405 may generate 615 the target detection 170 and the method 600 ends. In one embodiment, the processor 405 generates the target geometry 244 from the platform data 220. In addition, the processor 405 may generate a target location 246 from the platform data 220. In one embodiment, the target type 248 is retrieved from the target characteristics 250.

Figure 5C:
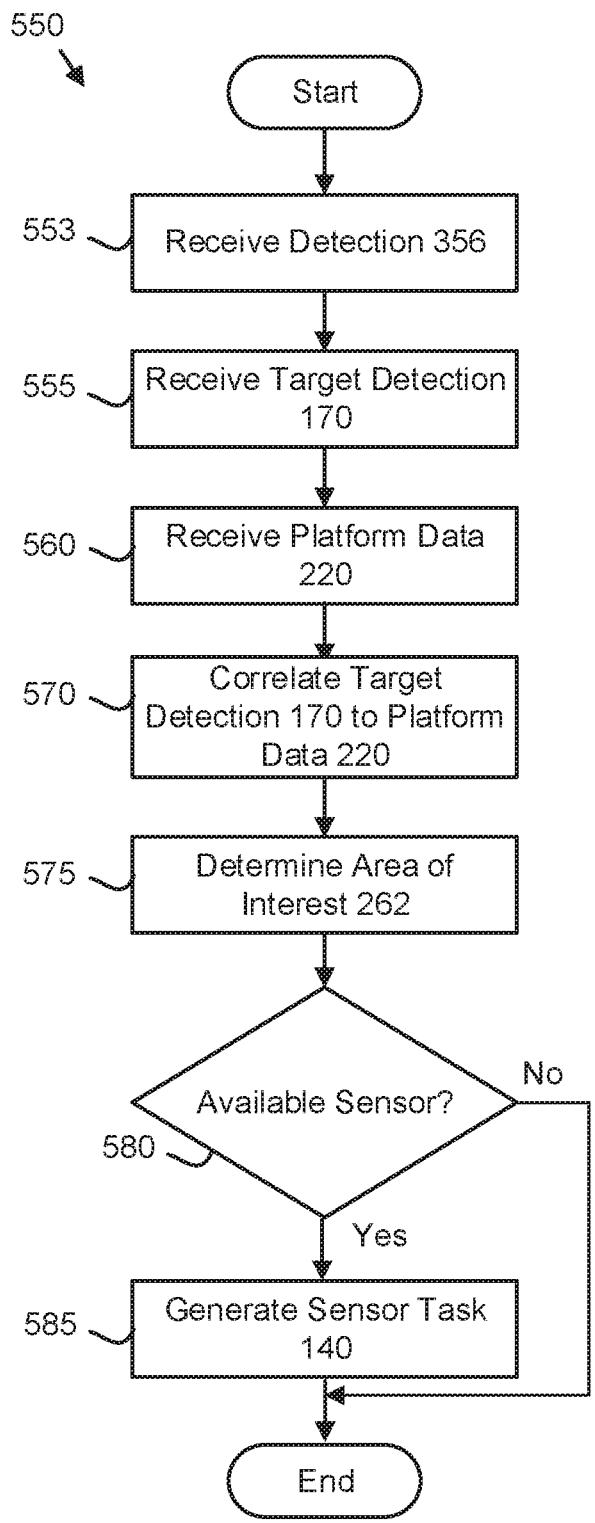
FIG. 5C is a schematic flow chart diagram illustrating one embodiment of a sensor task generation method.

FIG. 5C is a schematic flow chart diagram illustrating one embodiment of a sensor task generation method 550. The method 550 may generate a sensor task 140, such as for step 520 of FIG. 5A. The method 550 may be performed by one or more processors 405 of one or more processing nodes 160 in the system 100.

The method 550 starts, and in one embodiment, the processor 405 receives 553 a detection 356. The detection 356 may be generated by a data agent 135 in response to platform data 220 satisfying target characteristics 250 and/or one or more detection algorithms.

In one embodiment, the processor 405 receives 555 the target detection 170. The target detection 170 may be received 555 by one or more data agents 135 executed by the processor 405. The processor 405 further receives 560 platform data 220. The platform data 220 may be received from the data publisher 130 in response to a publish/subscribe relationship being satisfied.

In one embodiment, the publish/subscribe relationship may be established for the detection 356 and/or target detection 170 for the platform data 220. The publish/subscribe relationship may request all platform data 220 with measurement coordinates that are located at the detection 356 and/or target detection 170.

The processor 405 may correlate 570 the detection 356 and/or target detection 170 to the platform data 220. The target location 246 of the target detection 170 may be matched to the measurement coordinates 224 of the platform data 220. Alternatively, the measurement coordinates 224 corresponding to the detection 356 may be matched to the measurement coordinates 224 of the platform data 220. In one embodiment, the processor 405 matches a target geometry 244 of the target detection 170 to one or more geographic features from the sensor measurement 228 of the platform data 220. In addition, the processor 405 may match sensor measurements 228 corresponding to the detection 356 to one or more geographic features from the sensor measurement 228 of the platform data 220.

The processor 405 may determine 575 the area of interest 262 to be located at the measurement coordinates 224 for the sensor measurements 228 that correlate to the target geometry 244. In addition, the area of interest 262 may be determined 575 to have an area of interest radius from the measurement coordinates 224 for the sensor measurements 228 that correlate to the target geometry 244. In one embodiment, the area of interest radius is determined as a function of the target type 248. For example, if the target type 248 is a vehicle target type, the area of interest radius may be determined as a function of possible travel by the vehicle. Alternatively, if the target type 248 is a building target type, the area of interest radius may be calculated as a function of the measurement error 226.

The processor 405 may determine 580 if a sensor 120 is available to measure the area of interest 262. In one embodiment, a sensor 120 is available if the sensor platform 105 hosting the sensor 120 has a motion track 318 within the threshold distance of the area of interest 262. In an alternative embodiment, the sensor 120 is available if the motion track 318 for sensor platform 105 hosting the sensor 120 is within the threshold distance of the area of interest 262 during the time of interest 274. In a certain embodiment, the sensor 120 is available if the sensor availability 236 indicates the sensor 120 is available during the time of interest 274. If no sensor 120 is available, the method 550 ends.

If the sensor 120 is available, the processor 405 may generate 585 the sensor task 140 for the target detection 170 and the method 550 ends. In one embodiment, the sensor task 140 is generated 585 for a sensor 120 disposed on a sensor platform 105 with a motion track 318 that is within a threshold distance of the area of interest 262. In addition, the sensor task 140 may be generated 585 for a sensor 120 of a specified sensor type 234.

The processor 405 may generate 585 a sensor task 140 with a sensor motion track 264 that includes the area of interest 262. The sensor motion track 264 may be generated 585 to conform to the motion track 318 of the sensor platform 105 hosting the sensor 120. The processor 405 may further generate 585 the sensor task 140 with the sensor identifier 272 for the sensor 120, the node identifier 206 for the sensor platform 105, the time of interest 274, the voice command 266, the text command 268, and the sensor command 270.

Figure 5D:
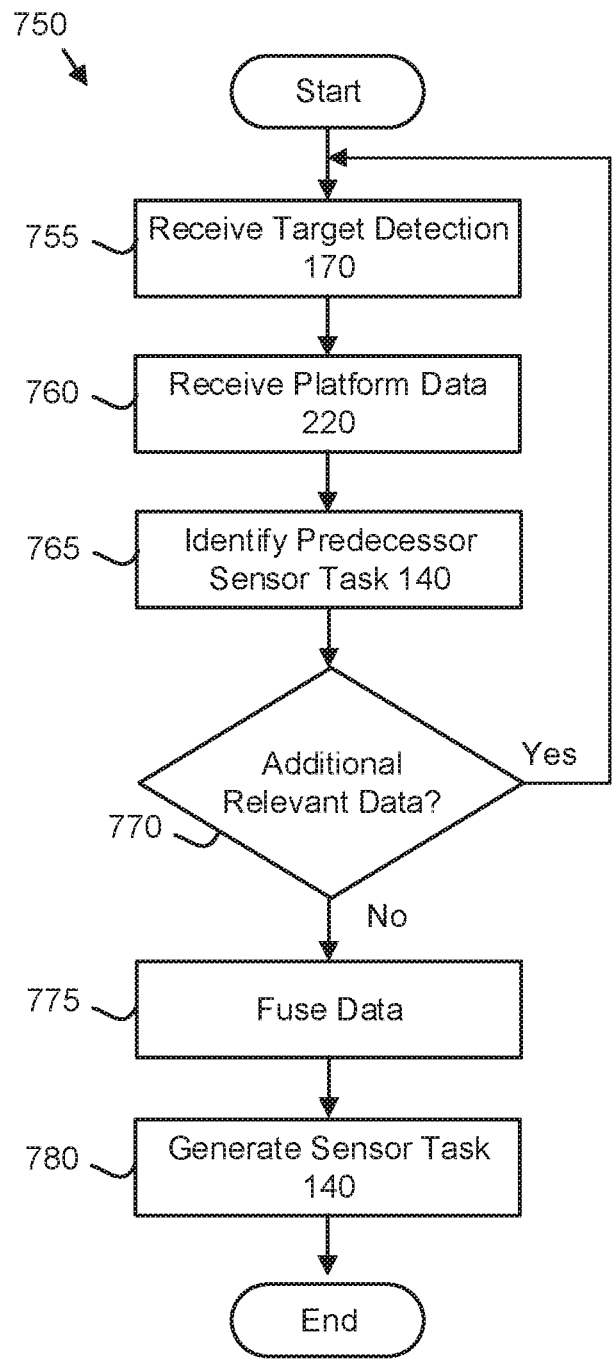
FIG. 5D is a schematic flow chart diagram illustrating one alternate embodiment of a sensor task generation method.

FIG. 5D is a schematic flow chart diagram illustrating one alternate embodiment of a sensor task generation method 750. The method 750 may fuse data from one or more of platform data 220, target detections 170, and/or sensor tasks 140 to generate a sensor task 140. The method 750 may be performed by one or more processors 405 of one or more processing nodes 160 in the system 100. In particular, the one or more processors 405 may host the data agents 135 and/or the agent manager 185.

The method 750 starts, and in one embodiment, the processor 405 receives 755 a target detection 170 and/or detection 356. A data agent 135 may receive 755 the target detection 170 and/or detection 356 in response to generation of the target detection 170 and/or detection 356. Alternatively, an administrator may activate the target detection 170 for processing by the data agent 135.

The processor 405 may further receive 760 platform data 220. In one embodiment, the data agent 135 requests a publish/subscribe relationship for platform data 220 related to the target detection 170. The data publisher 130 may generate the publish/subscribe relationship and receive the desired platform data 220 from the platform database 125. Measurement coordinates 224 of the platform data 220 may be requested that match the target location 246. Alternatively, the measurement coordinates 224 corresponding to the detection 356 may be requested.

The processor 405 further identifies 765 a predecessor sensor task 140. The predecessor sensor task 140 may have been responsible for the generation of the target detection 170, the detection 356, and/or the platform data 220. Alternatively, the predecessor sensor task 140 may have processed platform data 220 corresponding to the target location 246.

The processor 405 may further determine 770 if there is additional relevant data. In one embodiment, the data agent 135 examines the received detections 356, target detections 170, received platform data 220, and identified predecessor sensor tasks 140 to determine if additional detections 356, target detections 170, platform data 220, and/or predecessor sensor tasks 140 are related to the received detections 356, target detections 170, received platform data 220, and identified predecessor sensor tasks 140. If additional target detections 170, platform data 220, and/or predecessor sensor tasks 140 are relevant, the method 750 loops to receive 755 an additional target detection 170 or detection 356, receive 760 additional platform data 220, and/or identify an additional predecessor sensor task 140.

If no additional target detections 170 and detections 356, platform data 220, and/or predecessor sensor tasks 140 are relevant, the processor fuses 775 data from one or more of the target detections 170 and detections 356, platform data 220, and/or predecessor sensor task 140 as a new sensor task 140. In one embodiment, the data is filtered by removing data outside of the area of interest 262. In addition, one or more of a low-pass filter, a high pass filter, and a bandpass filter may be applied to the data.

The processor 405 may identify target detections 170 within the data. In one embodiment, the processor 405 identifies target detections 170 within the area of interest 262. In a certain embodiment, the processor 405 calculates score data 330 for each target detection 170. In addition, the processor 405 may calculate a target score using the score data 330.

In one embodiment, the processor 405 generates 780 the sensor task 140 and the method 750 ends. The processor 405 may generate 780 one or more sensor tasks 140 for each target detection 170 with the target score that exceeds a target threshold.

Figure 5E:
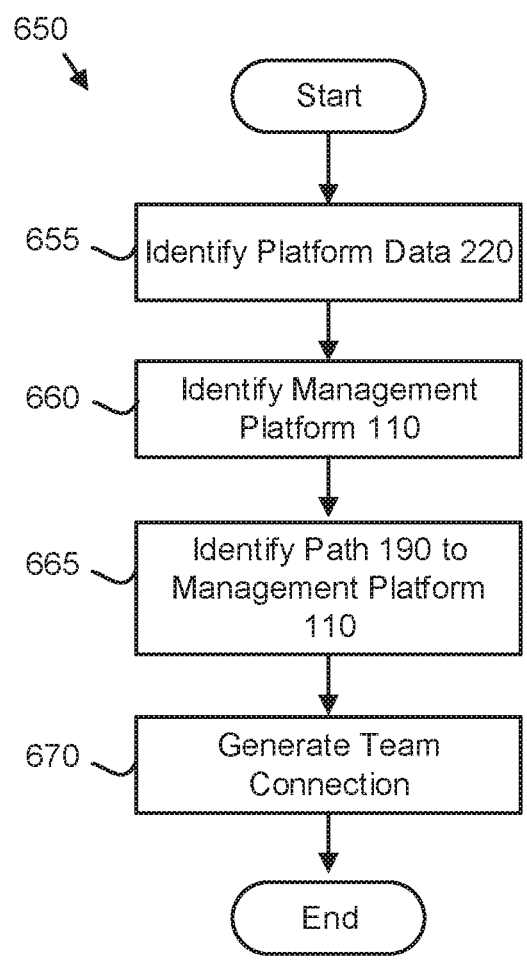
FIG. 5E is a schematic flow chart diagram illustrating one embodiment of a team connection generation method.

FIG. 5E is a schematic flowchart diagram illustrating one embodiment of a team connection generation method 650. The method 650 may generate a team connection 200. The method 650 may be performed by one or more processors 405 of one or more processing nodes 160 in the system 100.

The method 650 starts, and in one embodiment, the processor 405 identifies 655 platform data 220. The platform data 220 may include measurements needed by one or more users and/or administrators. The processor 405 further identifies 660 the management platform 110 of the one or more users and/or administrators and need the platform data 220.

The processor 405 may identify 665 at least one path 190 between the platform data 220 and the management platforms 110. The path 190 may comprise only links 195 that satisfy the IEEE 802 standard as of the filing of this application. In one embodiment, the identified at least one path 190 has a path loss level 316 that meets a loss level threshold. In addition, the identified at least one path 190 may have a path data rate 312 that meets a data rate threshold. In a certain embodiment, the identified at least one path 190 has a path priority 314 that meets a priority threshold.

The processor 405 may generate 670 the team connection 200 between the platform data 220 and the at least one management platform 110 of the one or more users and/or administrators the method 650 ends. In one embodiment, the processor 405 generates 670 the team identifier 202 with the path identifier 306 of the identified path 190. In addition, the processor 405 may record a node identifier 206 for each management platform 110 and each sensor platform 105 and/or management platform hosting the platform data 220. The processor 405 may further record a data index 222 for the platform data 220.

Figure 5F:
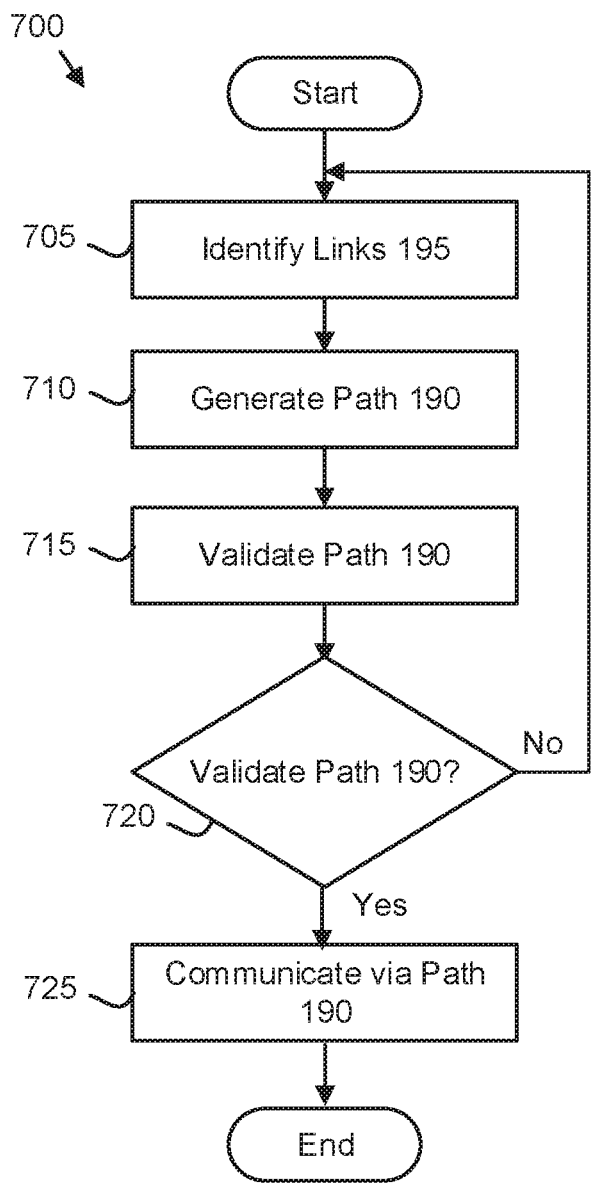
FIG. 5F is a schematic flowchart diagram illustrating one embodiment of a path communication method.

FIG. 5F is a schematic flowchart diagram illustrating one embodiment of a path communication method 700. The method 700 may generate and validate a path 190, and communicate via the path 190.

The method 700 starts, and in one embodiment, the processor 405 identifies 705 at least one link 195 that interconnects one or more of a sensor 120, platform data 220, and a mission manager 155. In one embodiment, the processor 405 identifies 705 links 195 until communications may be sent over a continuous network of the links 195 to each of the sensor 120, the platform data 220, and a mission manager 115.

The processor 405 further generates 710 a path 190 that comprises the identified links 195. In one embodiment, the processor 405 generates 710 the path data 192 of FIG. 3C.

The processor 405 may generate 710 the path data 192 from the link data 280 of each of the identified links 195. The generated path 190 may satisfy a path policy comprising one or more of a loss level threshold, a path type threshold, a path data rate threshold, and a path priority threshold. For example, the generated path 190 may satisfy the path policy if one or more of the path loss level 316 meets the loss level threshold, the path type 310 meets the path type threshold, the path data rate 312 meets the path data rate threshold, and the path priority 314 meets the path priority threshold.

The processor 405 may further validate 715 the path 190. In one embodiment, the processor validates 715 the path 190 by communicating a message over the path 190.

The processor 405 may determine 720 if the path 190 is validated. The path 190 may be validated if the path 190 is IEEE 802 compliant. In addition, the path 190 may be validated if the message is communicated over the path 190.

The path 190 may be validated if the loss level for the message meets the path loss level 316. The path 190 may further be validated if the data rate for the message meets the path data rate 312. If the selected path 190 is not validated, the processor 405 may identify 705 one or more alternate links 195 and generate 710 another path 190. If the path 190 is validated, the processor 405 may communicate 725 via the path 190 and the method 700 ends.

Figure 6A:
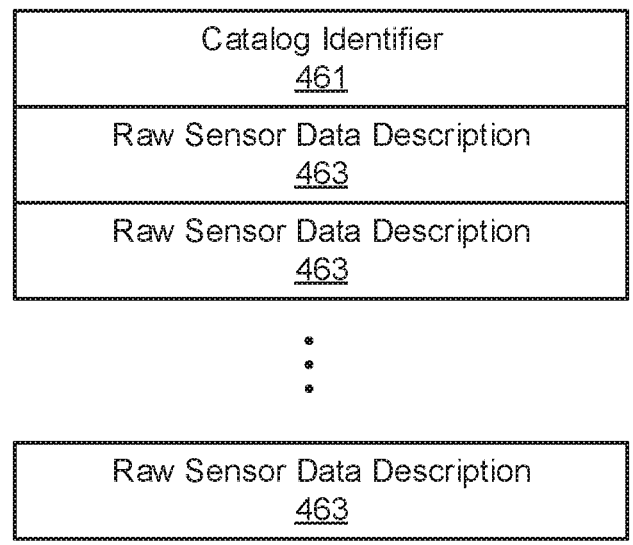
FIG. 6A is a schematic block diagram illustrating one embodiment of a catalog.
Figure 6B:
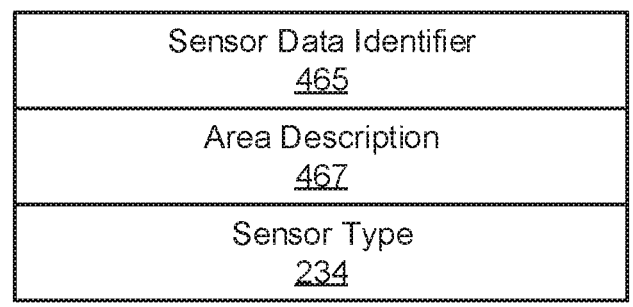
FIG. 6B is a schematic block diagram illustrating one embodiment of a raw sensor data description.

FIG. 6A is a schematic block diagram illustrating one embodiment of a catalog 460. The catalog 460 may be organized as a data structure in a memory 410. In the depicted embodiment, the catalog 460 includes a catalog identifier 461 and one or more raw sensor data descriptions 463. The catalog identifier 461 may uniquely identify the catalog 460. The raw sensor data descriptions 463 may each describe sensor data in the platform database 125 of at least one sensor platform 105 and/or management platform 110. The raw sensor data descriptions 463 are described in more detail in FIG. 6B FIG. 6B is a schematic block diagram illustrating one embodiment of the raw sensor data description 463. In the depicted embodiment, the raw sensor data description 463 includes a sensor data identifier 465, an area description 467, and a sensor type 234. The sensor data identifier 465 identifies sensor data. The area description 465 may describe an area covered by the sensor data. In one embodiment, the area description 467 includes a plurality of areas and each area includes a timestamp. The sensor type 234 describes the type of sensor 120 that recorded the sensor data.

Figure 6C:
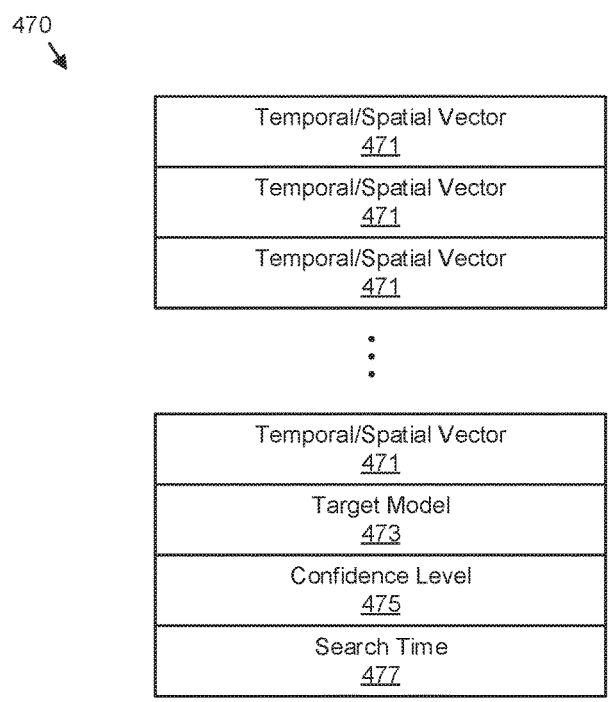
FIG. 6C is a schematic block diagram illustrating one embodiment of a dynamic target area.

FIG. 6C is a schematic block diagram illustrating one embodiment of a dynamic target area 470. The dynamic target area 470 may be organized as a data structure in a memory 410. In the depicted embodiment, the dynamic target area 470 includes one or more temporal/spatial vectors 471, a target model 473, a confidence level 475, and a search time 477. The temporal/spatial vectors 471 are described in more detail in FIG. 6D.

The target model 473 may be based on a target type 248 and/or target characteristics 250. The target model 473 may forecast movements of a target detection 170. The confidence level 475 may specify a desired confidence level for finding the target detection 170 within the dynamic target area 470. In one embodiment, the search time 477 specifies a historical time for the dynamic target area 470 up to the present.

FIG. 6D is a schematic block diagram illustrating one embodiment of the temporal/spatial vector 471. In the depicted embodiment, the temporal/spatial vector 471 includes a dynamic vector 481, a vector probability 483, and a vector start time 485. In a certain embodiment, the temporal/spatial vector 471 includes a plurality of vector sets wherein each vector set includes a dynamic vector 481, a vector probability 483, and a vector start time 485.

The dynamic vector 481 may describe a start spatial coordinate at the vector start time 485 and projected spatial coordinates before and after the vector start time 485. In one embodiment, each temporal/spatial vector 471 is a dynamic temporal/spatial vector 471 that changes as a function of the search time 477 and/or confidence level 475. As a result, the dynamic target area 470 also changes as a function of the search time 477 and/or the confidence level 475. For example, the temporal/spatial vector 471 may lengthen for later search times 477 and/or higher confidence levels 475.

Figure 6E:
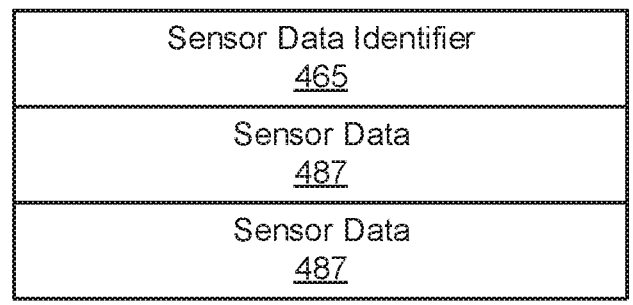
FIG. 6E is a schematic block diagram illustrating one embodiment of sensor data.

FIG. 6E is a schematic block diagram illustrating one embodiment of the sensor data 487. The sensor data 487 maybe organized as a data structure in a memory 410. The sensor data identifier 465 may identify the sensor data 487. In one embodiment, the sensor data 487 is raw sensor data 487 as received directly from a sensor 120. Alternatively, the sensor data 487 may be filtered and/or preprocessed sensor data 487.

Figure 7A:
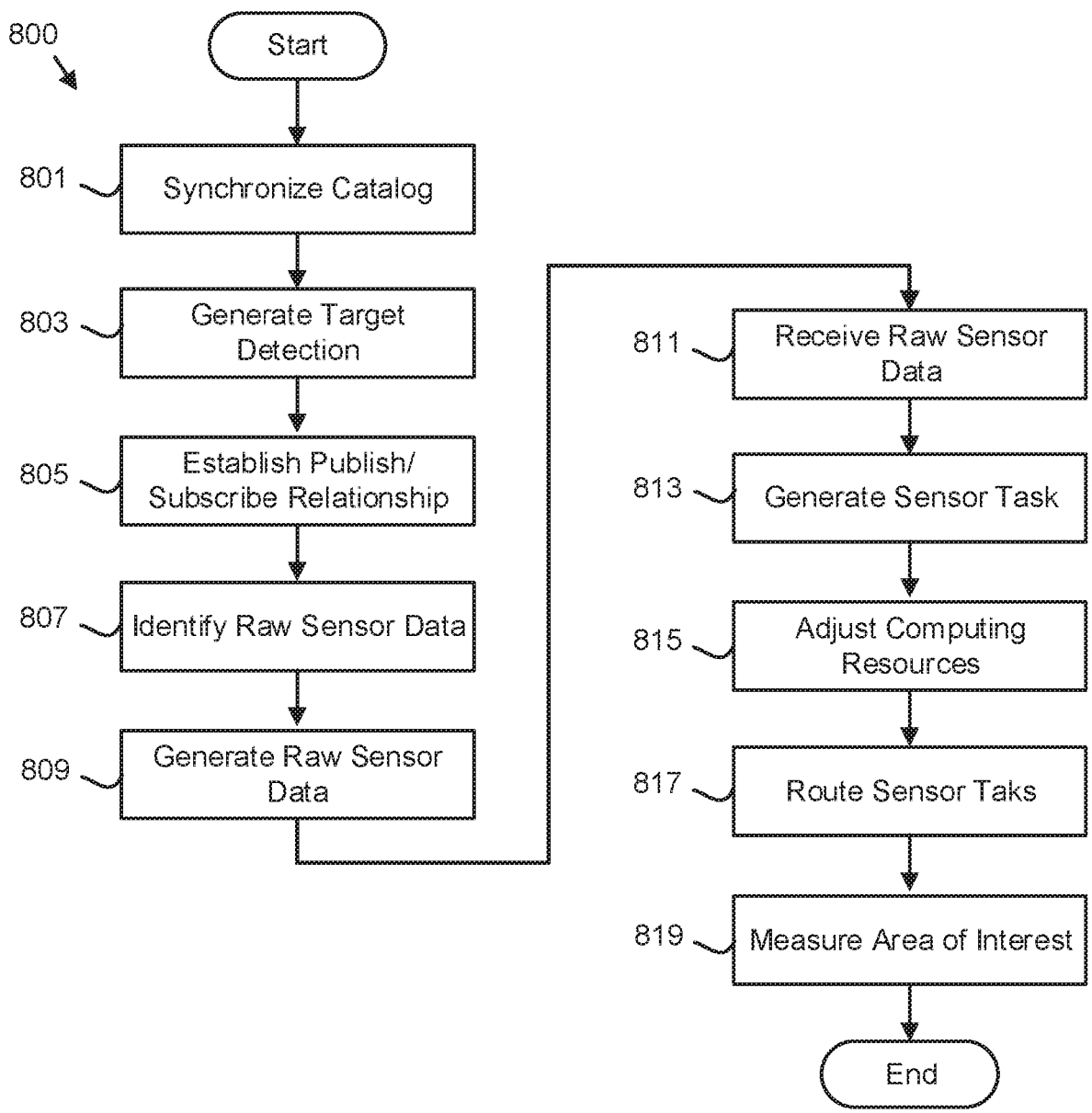
FIG. 7A is a schematic flow chart diagram illustrating one embodiment of an area of interest measurement method.

FIG. 7A is a schematic flow chart diagram illustrating one embodiment of an area of interest measurement method 800. The method 800 measures an area of interest 262 based on a sensor task 140. The method 800 may be performed by one or more processors 405 of one or more processing nodes 160 in the system 100.

The method 800 starts, and in one embodiment, the processor 405 synchronizes 801 a catalog 460 of sensor data 487. The processor 405 may synchronize 801 the catalog 460 to a first sensor platform 105 from a second sensor platform 105. The catalog 460 may identify raw sensor data 487. In addition, the catalog 460 may be organized to be searched by area description 467 and sensor type 234.

The processor 405 may generate 803 a target detection 170. The target detection may be generated 803 at the first sensor platform 105 in response to first sensor platform data satisfying the detection algorithm.

The processor 405 may establish 805 a publish/subscribe relationship for a dynamic target area 470 bounded by dynamic temporal/spatial vectors 471. The publish/subscribe relationship may be established 805 with the catalog 460. In one embodiment, the dynamic target area 470 is continuously updated based on the target model 473. In addition, the dynamic target area 470 may be continuously updated based on the confidence level 475. In one embodiment, the dynamic target area 470 is continuously updated based on the search time 477.

The processor 405 may identify 807 from the catalog 460 the raw sensor data 487 that satisfies the publish/subscribe relationship. In one embodiment, the processor 405 calculates the dynamic target area 470 as bounded by temporal/spatial vectors 471 for one or more of a given target model 473, a given confidence level 475, and a given search time 477. The processor 405 may further determine if an area description 465 is within the dynamic target area 470. If the area description 465 is within the dynamic target area 470, the raw sensor data description 463 and corresponding sensor data 487 identified by the sensor data identifier 465 satisfies the publish/subscribe relationship.

The processor 405 may generate 809 the raw sensor data 487 that satisfies the publish/subscribe relationship. In one embodiment, the raw sensor data 487 is generated 809 at the second sensor platform 105. The raw sensor data 487 may be transmitted from the second sensor platform 105 to the first sensor platform 105. The processor 405 may receive 811 the raw sensor data 487 in response to the publish/subscribe relationship. The raw sensor data 487 may be received 811 at the first sensor platform 105.

The processor 405 may generate 813 a sensor task 140 comprising a sensor type 234 and an area of interest 262 from the target detection 170 and/or the raw sensor data 487. In one embodiment, the processor 405 generates 813 the sensor task 140 as described in step 520 of FIG. 5A.

In one embodiment, the processor 405 adjusts 815 computing resources, such as the number of computers 400 and/or processor 405 for the sensor task 140, based on the sensor task 140. The computing resources may be adjusted 815 based on the expected quantity of sensor data 487.

The processor 405 may route 817 the sensor task 140 to a sensor 120 of the sensor type 234. In one embodiment, the sensor 120 has a sensor motion track 264 that comprises the area of interest 262. The sensor task 140 may be routed 815 as described in step 525 of FIG. 5A. The processor 405 may further measure 819 the area of interest 262 with the sensor 120 based on the sensor task 140 and the method 800 ends.

In one embodiment, the area of interest 262 is measured 819 based on a priority for the area of interest 262 and/or a target associated with the area of interest 262 based on the score data 330. For example, the area of interest 262 with a highest priority based on the score data 330 may be measured 819 first.

Figure 7B:
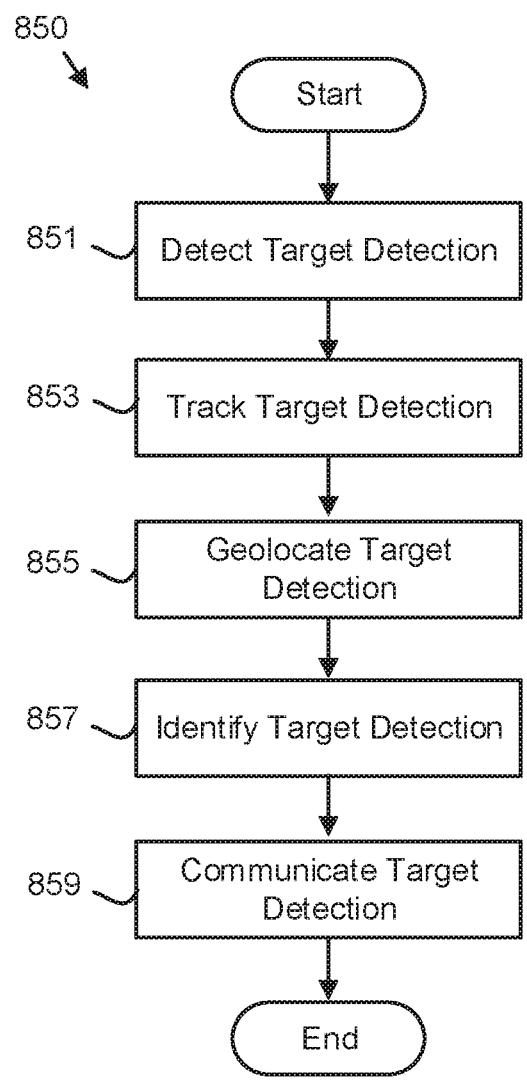
FIG. 7B is a schematic flow chart diagram illustrating one embodiment of the target detection management method.

FIG. 7B is a schematic flow chart diagram illustrating one embodiment of the target detection management method 850. The method 850 may manage target detections 170. The method 850 may be performed by one or more processors 405 of one or more processing nodes 160 in the system 100.

The method 850 starts, and in one embodiment, the processor 405 detects 851 a target detection 170. The target detection 170 may be detected 851 as described in FIG. 5B.

The processor 405 further tracks 853 the target detection 170. In one embodiment, the target detection 170 is tracked 853 based on the user priority score 340 and/or the agent priority score 344. In a certain embodiment, the target detection 170 is tracked 853 based on score data 330 for the area of interest 262.

The processor 405 may geolocate 855 the target detection 170. The target detection 170 may be geolocated 855 at the target location 246. In addition, the processor 405 may identify 857 the target detection 170. The target detection 170 may be identified 857 based on one or more of the target geometry 244, the target location 246, the target type 248, and/or the target characteristics 250. In one embodiment, the processor 405 communicates 859 the target detection 170 and the method 850 ends. In a certain embodiment, the target detection 170 is communicated 859 to a management platform 110.

The embodiments automatically generate the sensor task 140 with a sensor type 234 and area of interest 262. The sensor task 140 may be generated using the data agents 135 acting autonomously and/or under user control. The sensor task 140 may be automatically routed to a sensor 120 of the sensor type 234 and with a sensor motion track 264 that comprises the area of interest. The embodiments further automatically measure the area of interest 262 with the sensor 120 based on the sensor task 140. As a result, the measurement of the area of interest 262 and related data processing activities are greatly improved.

Figure 8A:
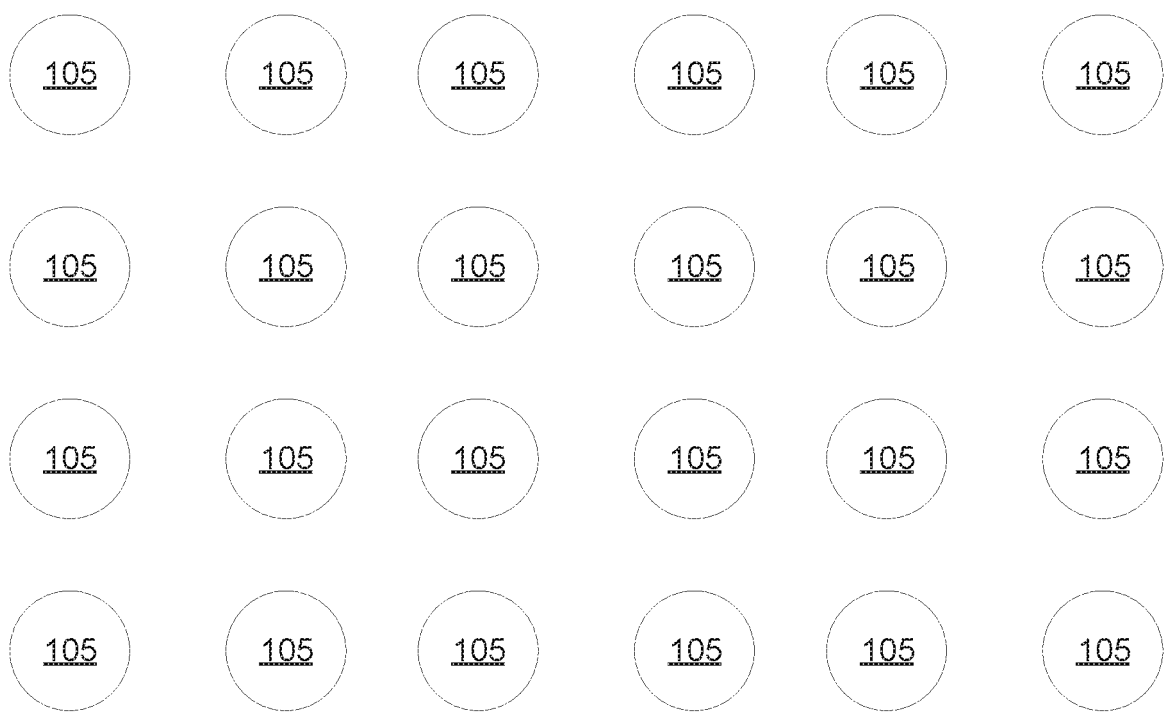
FIG. 8A is a schematic drawing illustrating one embodiment of sensor platforms.

FIG. 8A is a schematic drawing illustrating one embodiment of sensor platforms 105. A plurality of sensor platforms 105 may be deployed to the physical space. The plurality of sensor platforms 105 may be tasked with cooperatively gathering sensor data.

Figure 8B:
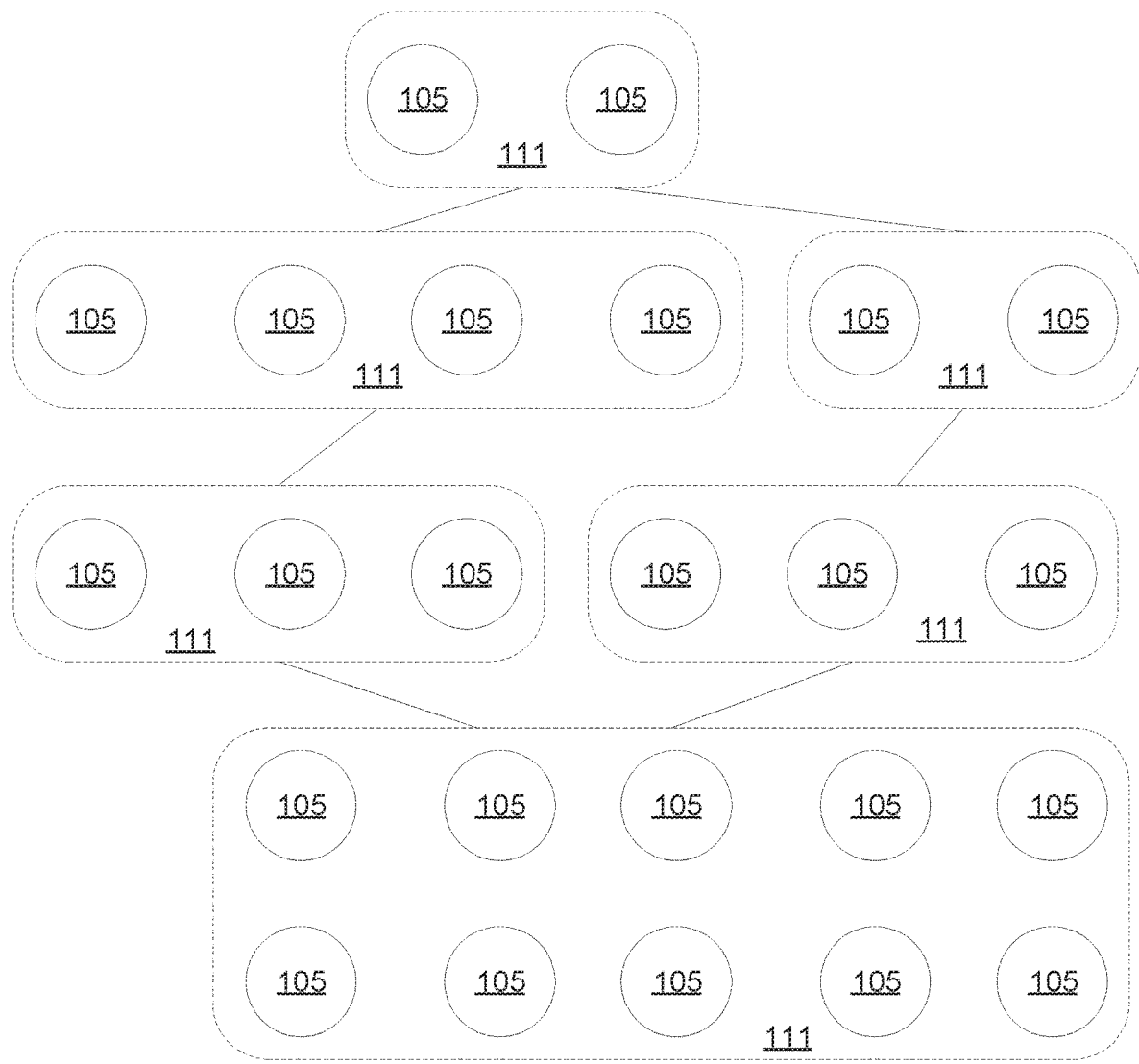
FIG. 8B is a schematic drawing illustrating one embodiment of a hierarchy of sensor platforms.

FIG. 8B is a schematic drawing illustrating one embodiment of a hierarchy of sensor platforms 105. In the depicted embodiment, the sensor platforms 105 of FIG. 8A are organized into platform groups 111. The plurality of sensor platforms 105 may be organized into platform groups 111 based on location and/or link data rate 290.

In one embodiment, the platform groups 111 are based on geographic proximity. For example, a sensor platform 105 may be assigned to a platform group 111 with the nearest group center. The group center may be calculated as an average position of the sensor platforms 105 in the platform group 111. The location of the sensor platform 105 may be determined from the motion track 318. A current location on the motion track 318 may be used. In addition, a future location on the motion track 318 may also be used.

Alternatively, a sensor platform 105 may be assigned to a platform group 111 of the nearest neighbor sensor platform 105. In addition, a given sensor platform 105 may be assigned to a platform group 111 with a neighbor sensor platform 105 that is in communication with the given sensor platform 105 over an acoustic communication link 195.

In one embodiment, the platform groups 111 are based on the link data rate 290 of the communication links 195. For example, a given sensor platform 105 may be assigned to a platform group 111 that includes a neighbor sensor platform 105 with the link 195 with the fastest link data rate 290 to the given sensor platform 105.

In one embodiment, the platform groups 111 are organized a hierarchy. The hierarchy may be based on location. For example, the platform group 111 with the closest geographic proximity to a management platform 110 may be assigned the highest level in the hierarchy. In addition, the hierarchy may be based on link data rate 290. For example, the platform group 111 with the fastest link 195 to the management platform 111 may be assigned the highest level in the hierarchy.

Additional platform groups 111 may be assigned to positions in the hierarchy based on location and/or link data rate. For example, a platform group 111 with the closest geographic proximity to the highest level platform group 111 may be assigned to a next level in the hierarchy. In addition, the platform group 111 with the fastest link 195 to the highest level platform group 111 may be assigned to the next level in the hierarchy. The location and/or link data rate criteria may be applying to all platform groups 111 until the platform groups 111 are organized in the hierarchy.

Figure 8C:
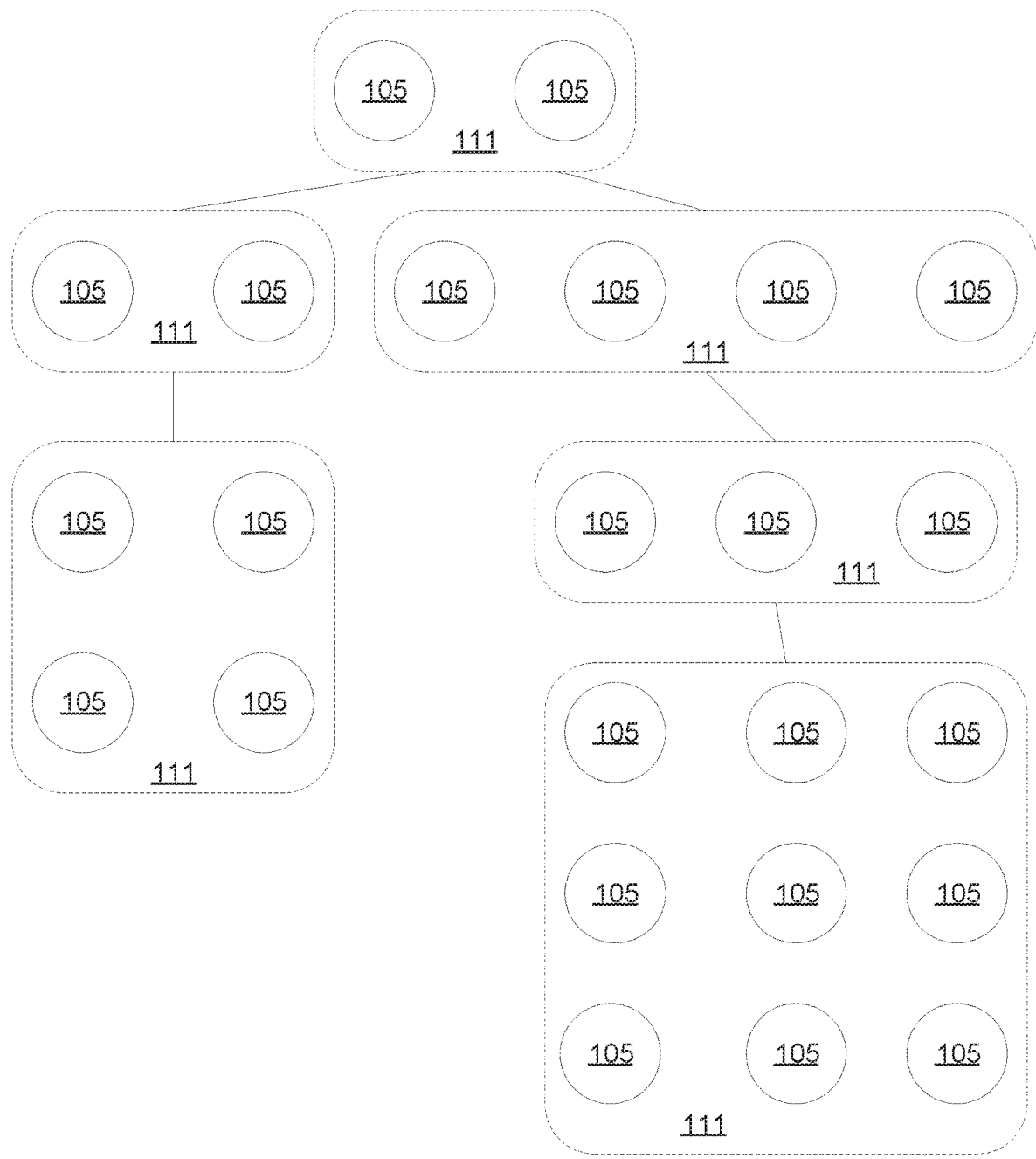
FIG. 8C is a schematic drawing illustrating one alternate embodiment of a hierarchy of sensor platforms.

FIG. 8C is a schematic drawing illustrating one alternate embodiment of a hierarchy of sensor platforms 105 and/or platform groups 111. In the depicted embodiment, the sensor platforms 105 of FIG. 8A are dynamically reorganized into new platform groups 111 and/or a new hierarchy of platform groups 111. The sensor platforms 105 may be dynamically organized into the platform groups 111 and/or the hierarchy of platform groups 111 based on location and/or link data rate 290.

Figure 9A:
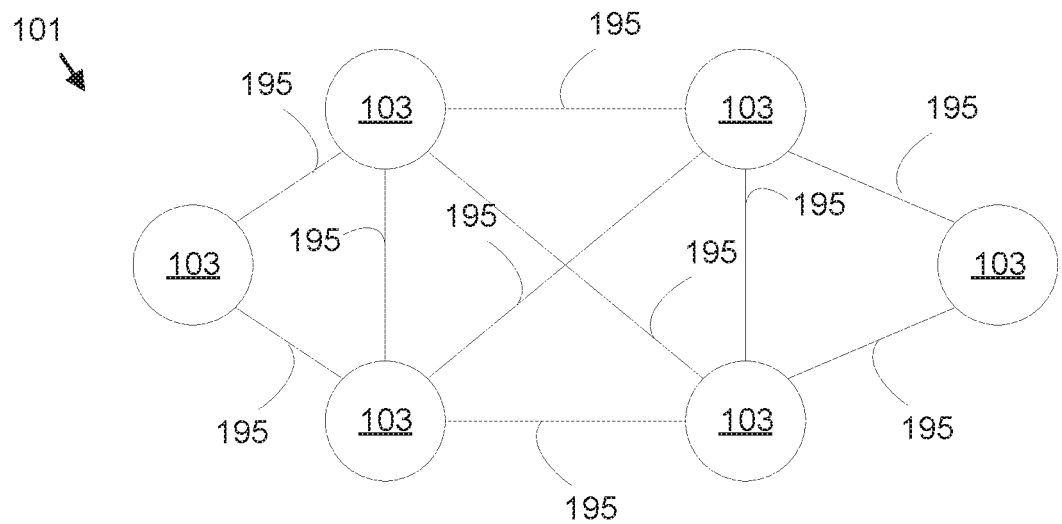
FIG. 9A is a schematic drawing illustrating one embodiment of a network.

FIG. 9A is a schematic drawing illustrating one embodiment of a network 101. The network 101 may comprise the communication channels 115 and/or paths 190. The network 101 provides communications between sensor platforms 105 and/or management platforms 110 using links 195. The network 101 comprises a plurality of network nodes 103 at the sensor platforms 105 and/or management platforms 110. The network nodes 103 may be with in a platform group 111. For example, one or more sensor platforms 105 of a given platform group 111 may be designated as a network node 103. The network nodes 103 may communicate over links 195. The network 101 is described by a network topology.

Figure 9B:
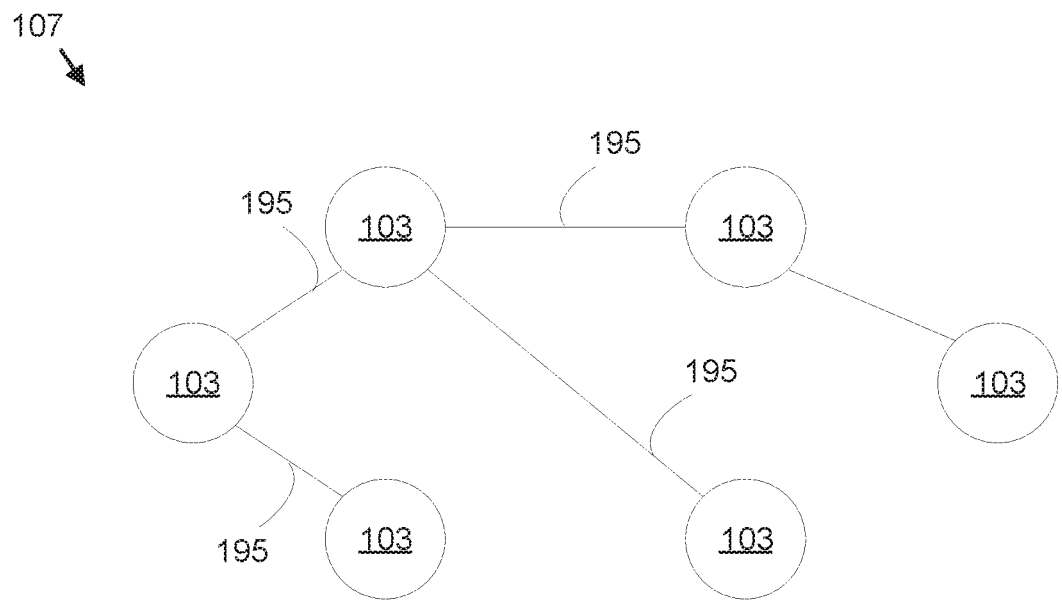
FIG. 9B is a schematic drawing illustrating one embodiment of a minimum spanning tree.

FIG. 9B is a schematic drawing illustrating one embodiment of a minimum spanning tree 107 for the network 101 of FIG. 9A. In the depicted embodiment, the minimum spanning tree 107 is generated for each platform group 111 and for network nodes 103 with in each platform group 111. The minimum spanning tree 107 may be dynamically generated from the network topology. For example, the network topology may be discovered for the network 101 and the minimum spanning tree 107 generated from the network topology.

In one embodiment, the minimum spanning tree 107 satisfies a restriction that given sensor data 487 traverses one communication link 195 of the minimum spanning tree 107 only once. At least one link 195 of the minimum spanning tree 107 is an acoustic communication link 195.

Figure 9C:
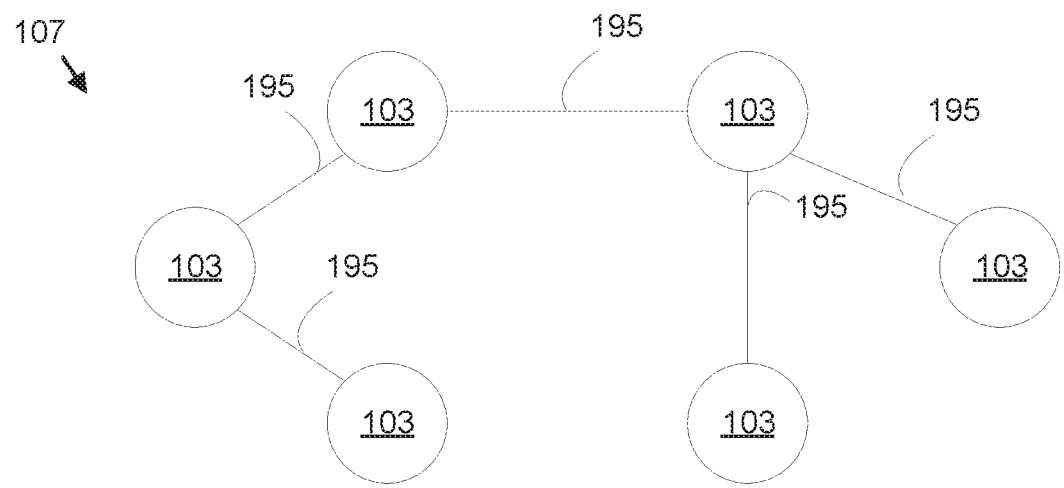
FIG. 9C is a schematic drawing illustrating one alternate embodiment of a minimum spanning tree.

FIG. 9C is a schematic drawing illustrating one alternate embodiment of a minimum spanning tree 107. In the depicted embodiment, the network 101 of FIG. 9A and the minimum spanning tree 107 of FIG. 9B is dynamically regenerated as a new minimum spanning tree 107 from the network topology. For example, the network topology may be discovered for the network 101 and include changes from a previous network topology. The new minimum spanning tree 107 may be dynamically regenerated from the new network topology.

Figure 10A:
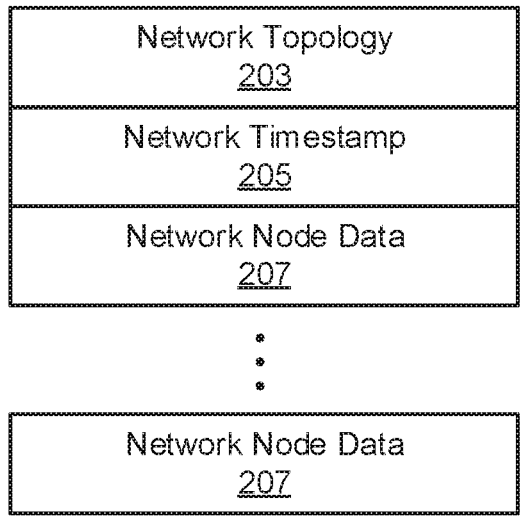
FIG. 10A is a schematic block diagram illustrating one embodiment of network data.

FIG. 10A is a schematic block diagram illustrating one embodiment of network data 201. The network data 201 may describe the network 101. The network data 201 may be organized as a data structure in a memory. In the depicted embodiment, the network data 201 includes the network topology 203, a network timestamp 205, and a plurality of network node data 207.

The network topology 203 may describe the links 195 that connect each network node 103. The network timestamp 205 may record when the minimum spanning tree 107 was last generated from the network topology 203. Each instance of network node data 207 may describe a network node 103. The network node data 207 is described in more detail in FIG. 10B.

Figure 10B:
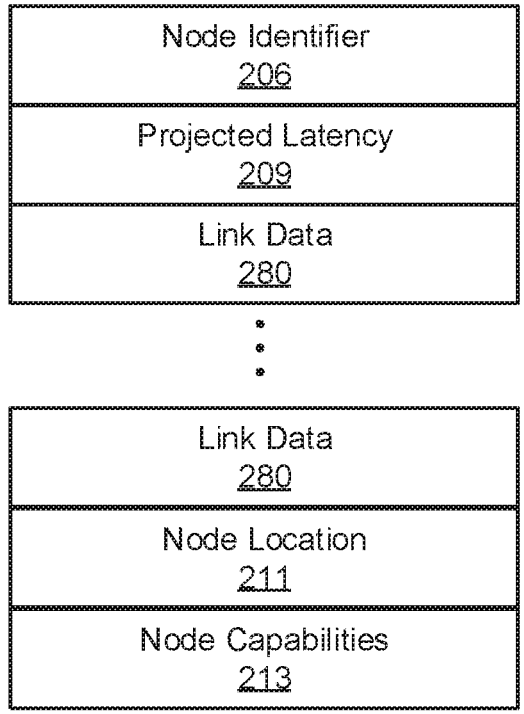
FIG. 10B is a schematic block diagram illustrating one embodiment of network node data.

FIG. 10B is a schematic block diagram illustrating one embodiment of the network node data 207. The network node data 207 describes a network node 103. In the depicted embodiment, the network node data 207 includes a node identifier 206, a projected latency 209, link data 280, a node location 211, and node capabilities 213.

The node identifier 206 may uniquely identify a node 103. The link data 280 describes the links 195 in communication with the network node 103. The projected latency 209 estimates the latency for communicating sensor data over each of the links 195 in communication with the network node 103.

The node location 211 records a physical location of the network node 103. The physical location may be a current and/or future location of a sensor platform 105 determined from the motion track 318. The node capabilities 213 records the communication capabilities of the network node 103 over each link 195. The node capabilities 213 may include a minimum latency, a maximum latency, an average latency, and the like. In addition, the node capabilities 203 may indicate a link type 288 for each link 195. The link types 288 may include radio frequency, optical, acoustic, and the like.

Figure 10C:
FIG. 10C is a schematic block diagram illustrating one embodiment of sensor data.

FIG. 10C is a schematic block diagram illustrating one embodiment of the sensor data 487. The sensor data 487 may be organized as a data structure in a memory. In addition, the sensor data 487 may be organized as packets that are communicated via the links 195. In the depicted embodiment, the sensor data 487 includes a data index 222, data 227, a priority value 223, a data location 237, and a confidence contribution 233.

The data index 222 may uniquely identify the sensor data 487. The data 227 may include raw data from a sensor 120, process raw data that is referred to hereafter as process data, and/or data segments as will be described hereafter. The data location 237 indicates the physical space covered by the data 227

The confidence contribution 233 estimates the likelihood that the sensor data 487 will contribute to a mission objective and/or mission task. For example, if the mission objective is identifying a metal object in the physical space, the confidence contribution 233 estimates the likelihood that the sensor data 487 will add to the identification of the metal object. The priority value 223 may be calculated for the sensor data 487. In one embodiment, the priority value 223 is calculated based on the confidence contribution 233 to the mission objective.

In one embodiment, the priority value PV 223 is calculated using Equation 1, where CC is the confidence contribution 223, FB is free bandwidth of the network 101, DS is a data size of the data 227, and j is a nonzero constant.

$$PV=j*CC*(FB/DS) \qquad \text{Equation 1}$$

The confidence contribution 233 may be calculated as a function of completed mission tasks, node location 211, and/or node capabilities 213. In one embodiment, the confidence contribution CC 233 is calculated using Equation 2, where CMT is a percentage of completed mission tasks for a platform group 111, a sensor platform 105, and/or a sensor 120, MAD is a mission area distance from the data location 237 and/or node location 211 to a mission area of the mission objective, MDT is one if the node capabilities 312 support a sensor type 234 needed for the mission objective and/or a mission task and zero if the node capabilities 312 do not support the sensor type 234 needed for the mission objective and/or mission task, and k is a nonzero constant.

$$CC=(k*CMT/MAD)*MDT \qquad \text{Equation 2}$$

Figure 10D:
FIG. 10D is a schematic block diagram illustrating one embodiment of data segments.

FIG. 10D is a schematic block diagram illustrating one embodiment of data segments 229. In one embodiment, the data 227 is organized as a plurality of data segments 229. Each data segment 229 may be for a different data location 237. In addition, each data segment 229 may be for a different sensor type 234.

In one embodiment, each data segment 229 includes a confidence contribution 233 for the data segment 229. In addition, each data segment 229 may be associated with the confidence contribution 233 for the sensor data 487.

Figure 10E:
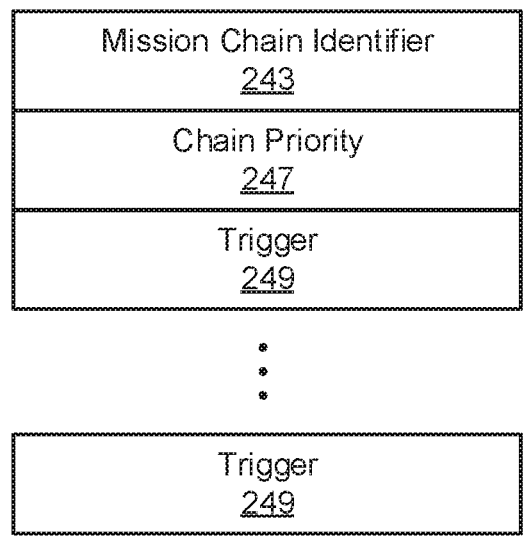
FIG. 10E is a schematic block diagram illustrating one embodiment of a mission chain.

FIG. 10E is a schematic block diagram illustrating one embodiment of a mission chain 241. The mission chain 241 may indicate whether to route a sensor task 141 to a sensor 120 and/or perform other functions. The mission chain 241 may be organized as a data structure in a memory and/or as packets communicated via a link 195. In the depicted embodiment, the mission chain 241 includes a mission chain identifier 243, a chain priority 247, and one or more triggers 249.

The mission chain identifier 243 may uniquely identify the mission chain 241. The chain priority 247 may be a priority assigned to the mission chain 241. The chain priority 247 may be assigned by the administrator. Alternatively, the chain priority 247 may be autonomously calculated.

The triggers 249 may specify trigger types, trigger criteria, and trigger behavior as will be described hereafter in FIG. 10F. One or more of the triggers 249 may be satisfied in order to satisfy the mission chain 241. In addition, each trigger 249 may initiate a trigger behavior if the trigger criteria is satisfied regardless of whether other triggers 249 in the mission chain 241 are satisfied. The plurality of triggers 249 are chained together to allow the sensor management system 100 to autonomously perform complex operations.

Figure 10F:
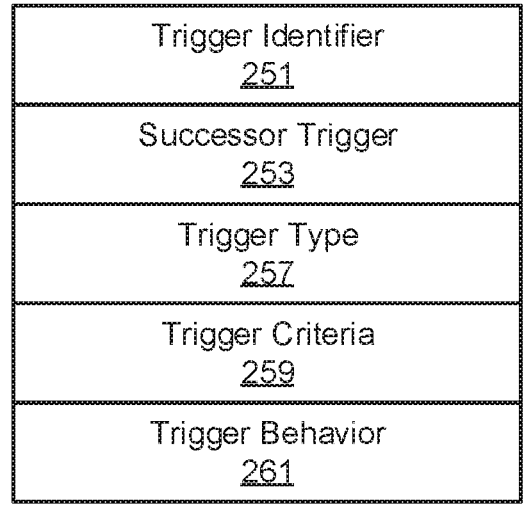
FIG. 10F is a schematic block diagram illustrating one embodiment of a trigger.

FIG. 10F is a schematic block diagram illustrating one embodiment of a trigger 249. In the depicted embodiment, the trigger 249 includes a trigger identifier 251, a successor trigger 253, a trigger type 257, the trigger criteria 259, and the trigger behavior 261. The trigger identifier 251 may uniquely identify the trigger 249. The successor trigger 253 may identify the trigger identifier 251 of another trigger 249 that is activated in response to satisfying the trigger criteria 259.

The trigger type 257 may broadly describe the trigger 241 and/or trigger behavior 261. The trigger type 257 may indicate a detect trigger 249, a track trigger 249, a geolocate trigger 249, an identify trigger 249, and/or an inform trigger 249. The detect trigger 249 may direct the detecting of a target detection 170. The track trigger 249 may direct the tracking of a target detection 170. The identify trigger 249 may direct the identification of a target detection 170. The inform trigger 249 may direct the informing of the management platform 110 and/or another sensor platform 105 of a target detection 170 and/or another event.

The trigger criteria 259 may specify criteria that must be satisfied before performing the trigger behavior 261 and/or triggering the successor trigger 253. The trigger behavior 261 may be performed in response to satisfying the trigger criteria 259.

Figure 10G:
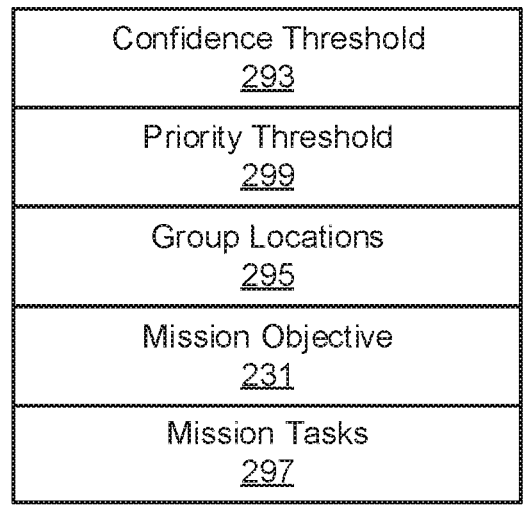
FIG. 10G is a schematic block diagram illustrating one embodiment of mission data.

FIG. 10G is a schematic block diagram illustrating one embodiment of mission data 291. The mission data 291 may enable the definition and completion of a mission by the sensor management system 100. The mission data 291 may be organized as a data structure in a memory. In the depicted embodiment, the mission data 291 includes a confidence threshold 293, a priority threshold 299, group locations 295, mission tasks 297, and the mission objective 231.

The confidence threshold 293 may specify a minimum confidence contribution 233 for which an action such as communicating sensor data 487 and/or a data segment 229 is performed. The priority threshold 299 may specify a minimum priority value 223 for which an action such as communicating the sensor data 487 is performed.

The group locations 295 record the locations of the platform groups 111. In one embodiment, the group locations 295 records an area that encloses each platform group 111. In addition, the group locations 295 may record a center of each platform group 111.

The mission objective 231 specifies a mission for the sensor platforms 105. The mission objective 231 may include an area of interest 262 and/or a sensor type 234. In one embodiment, the mission objective 231 comprises a target identifier 242, a target geometry 244, a target location 246, a target type 248, and target characteristics 250.

The mission objective 231 may comprise a plurality of mission tasks 297. Each mission task 297 may specify an area of interest 262 and/or sensor type 234. In one embodiment, the mission task 297 comprises a target identifier 242, a target geometry 244, a target location 246, a target type 248, and target characteristics 250. The mission tasks 297 may be autonomously assigned to the sensors 120 and/or sensor platforms 105 as will be described hereafter.

Figure 11A:
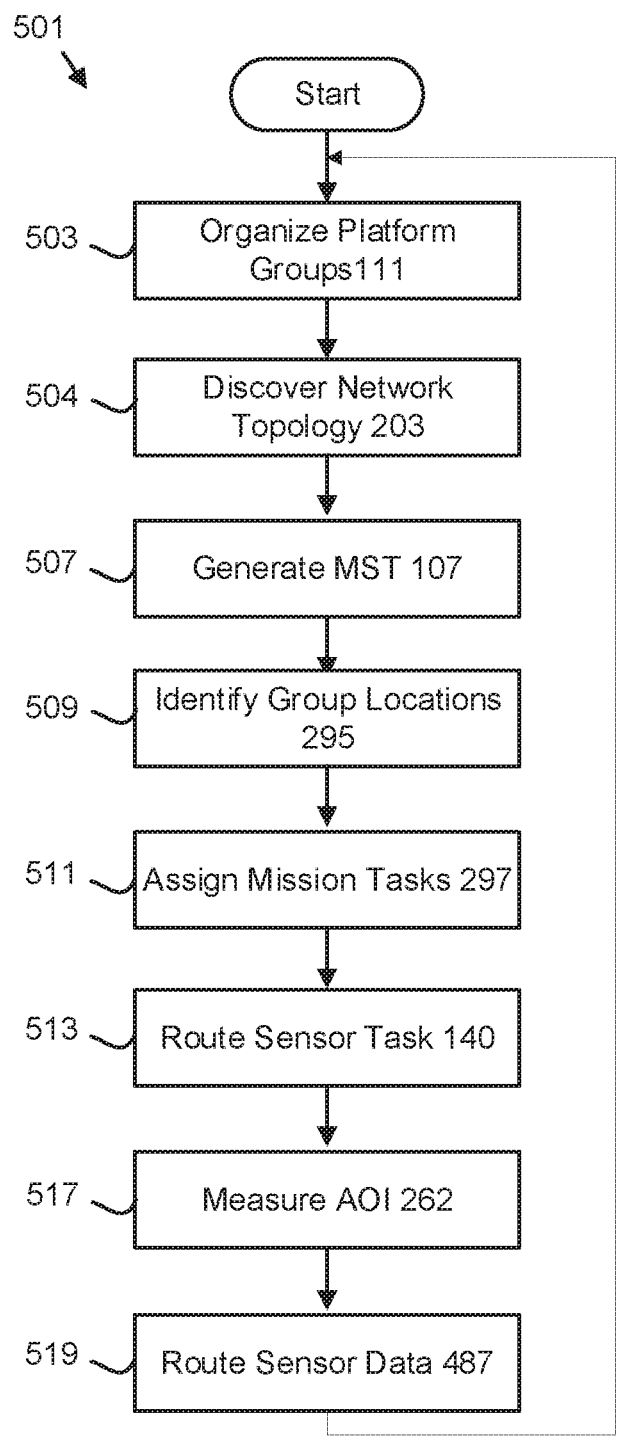
FIG. 11A is a schematic flow chart diagram illustrating one embodiment of an area of interest measurement method.

FIG. 11A is a schematic flow chart diagram illustrating one embodiment of an area of interest measurement method 501. The method 501 may measure the area of interest 262. In addition, the method 501 may route sensor data 487 from the measurement of the area of interest 262. The method 501 may be performed by one or more processors 405 of the sensors 120 and/or sensor platforms 105, and by the sensor management platform 100, the sensors 120 and/or sensor platforms 105.

The method 501 starts, and in one embodiment, the processor 405 dynamically organizes 503 a plurality of sensor platforms 105 into platform groups 111. The platform groups 111 may be organized 503 based on location and/or link data rate 290. The processor 405 may organize 503 the platform groups 111 as described in FIG. 8B. Each platform group 111 may include one or more network nodes 103. In one embodiment, each sensor platform 105 and/or management platform 110 is a network node 103.

The processor 405 may further discover 504 the network topology 203 for the network 101. The network 101 may include a plurality of network nodes 103. In one embodiment, the processor 405 directs each network node 103 to respond with a packet sent over each link 195 in communication with the network node 103. The processor 405 may discover 504 the network topology 203 based on the responses. The processor 405 may discover 504 the network topology 203 after a specified discovery time interval has elapsed from the network timestamp 205.

The processor 405 may generate 507 the minimum spanning tree 107 from the network topology 203. This minimum spanning tree 107 may include only one network node 103 for each platform group 111. In addition, each platform group 111 may be organized 507 as a minimum spanning tree 107. Thus, the processor 405 may generate 507 the minimum spanning tree 107 for each platform group 111 and for network nodes 103 within each platform group 111.

Alternatively, the minimum spanning tree 107 may include one or more network nodes 103 for each platform group 111. In a certain embodiment, the minimum spanning tree 107 includes all network nodes 103 of each platform group 111.

The minimum spanning tree 107 may be generated 507 such that given sensor data 487 traverses one link 195 of the minimum spanning tree 107 only once. Alternatively, the minimum spanning tree 107 may be generated 507 to minimize a total number of hops between network nodes 103. In a certain embodiment, the minimum spanning tree 107 is generated 507 to minimize an average number of hops between network nodes 103.

The processor 405 may identify 509 the group locations 295 for the platform groups 111. In one embodiment, the processor 405 requests that each network node 103 respond with a node location 211. The processor 405 may further identify 509 the area and/or center of each platform group 111 as the group locations 295.

The processor 405 may assign 511 the mission tasks 297 to platform groups 111, sensor platforms 105, and/or sensors 120. In one embodiment, the processor 405 communicates the mission tasks 297 to the platform groups 111, the sensor platforms 105, and/or the sensors 120, referred to herein individually as a unit. Each unit evaluates whether the unit can perform a mission task 297. In one embodiment, the unit calculates the confidence contribution 233 for the mission task 297. The confidence contribution 233 may be calculated using Equation 2. If the calculated confidence contribution 233 exceeds the confidence threshold 293, the unit may autonomously assign 511 itself the mission task 297.

The processor 405 may further route 513 a sensor task 140 based on the mission task 297 to a sensor 120 with the sensor motion track 264 that comprises the area of interest 262 for the mission task 297. Routing 513 the sensor task 140 may comprising transmitting the sensor task 140 via one or more links 513 to a corresponding sensor platform 105. In one embodiment, the sensor task 140 is routed 513 via the minimum spanning tree 107. In addition, the sensor 120 may be of the sensor type 234 required for the mission task 297.

In one embodiment, the sensor task 140 is routed 513 to the sensor 120 in response to a mission chain 241. For example, a mission chain 241 may include a detect trigger 249, a geolocate trigger 249, an identify trigger 249, and an inform trigger 249. The detect trigger 249 may include trigger criteria 259 that is satisfied in response to detecting a metal object in the physical space. In response to satisfying the trigger criteria 259 by detecting the metal object at one or more sensor platforms 105, the detect trigger 249 may initiate a trigger behavior 261 of locating the metal object as a target detection 170. As a result, sensor platforms 105 may be routed to precisely locate the target detection 170.

The detect trigger 249 further may activate a successor trigger 253 that is the geolocate trigger 249. The geolocate trigger 249 may include trigger criteria 259 that is satisfied in response to locating the target detection 170. In response to satisfying the trigger criteria 259 by locating the target detection 170, the geolocate trigger 249 may initiate a trigger behavior 261 of identifying the target detection 170. As a result, sensor platforms 105 and/or the management platform 110 may be directed to process the sensor data 487 for the target detection 170 and identify the target detection 170.

The geolocate trigger 249 may further activate a successor trigger 253 that is the identify trigger 249. The identify trigger 249 may include trigger criteria 259 that is satisfied in response to identifying the target detection 170. In response to satisfying the trigger criteria 259 by identifying the target detection 170, the identify trigger 249 may initiate a trigger behavior 261 of informing a management platform 110 of the identification of the target detection 170.

In addition, the identify trigger 249 may activate a successor trigger 253 that is the inform trigger 249. The inform trigger 249 may include trigger criteria 259 that is satisfied in response to receiving an acknowledgment from the management platform 110 of receipt of the identification of the target detection 170. In response to satisfying the trigger criteria 259 by receiving the acknowledgment, the inform trigger 249 may initiate a trigger behavior 261 of notifying the sensor platforms 105 of the completion of a mission task 297 and/or the mission objective 231.

The processor 405 may direct the sensor 120 to measure 517 the area of interest 262 based on the sensor task 140. The sensor 120 may record the data 227 and/or sensor data 487 to the platform database 125 as platform data 220.

In one embodiment, the processor 405 routes 519 the sensor data 487 from the measurement of the area of interest 262 via the links 195 of the minimum spanning tree 107. For example, the processor 405 of a sensor 120 and/or sensor platform 105 may route 519 the sensor data 487 via the links 195 of the minimum spanning tree 107 to the management platform 110. Alternatively, the sensor data 487 may be routed 519 to the requesting sensor platform 105 and/or management platform 110. The sensor data 487 may be routed as platform data 220. One embodiment of the routing 519 of the sensor data 487 is described in FIG. 11B.

The method 501 may loop to dynamically reorganize 503 the sensor platforms 105 into platform groups 111. As a result, as a location of each sensor platform 105 changes, the platform groups 111, the network topology 203, and/or the minimum spanning tree 107 are continually updated. Thus, the mission tasks 297 are efficiently assigned 511 and the sensor tasks 140 are efficiently routed 513 to the sensor platforms 105, resulting in the rapid and efficient measurement 517 of the areas of interest 262. In addition, the sensor data 487 is efficiently and rapidly routed 519 for further processing and/or analysis. As a result, the efficiency of all the sensor platforms 105 and the sensor management system 100 is improved.

Figure 11B:
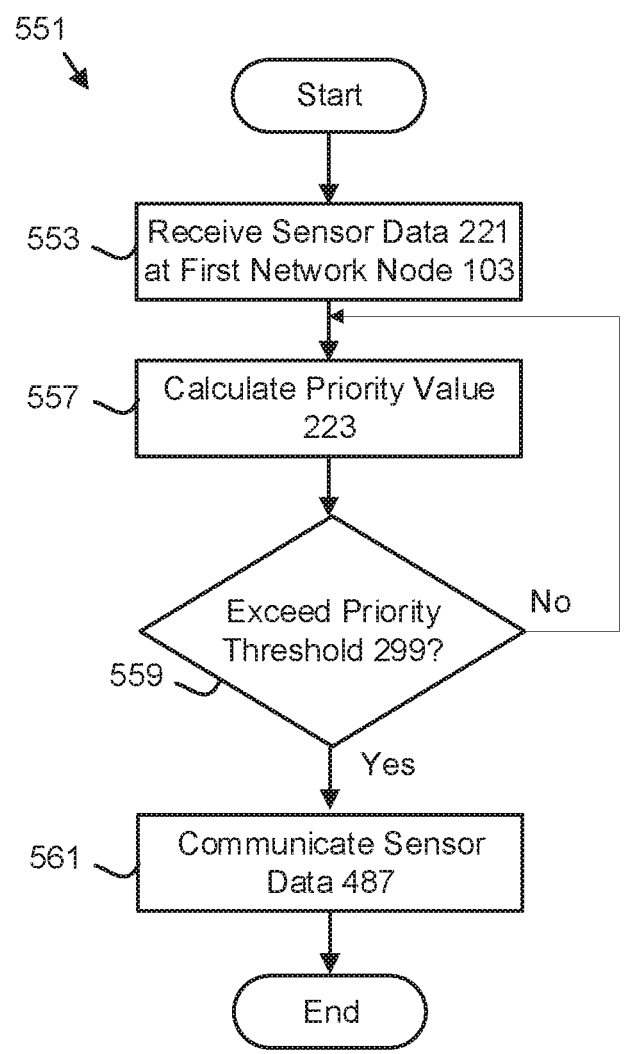
FIG. 11B is a schematic flow chart diagram illustrating one embodiment of a sensor data communication method.

FIG. 11B is a schematic flow chart diagram illustrating one embodiment of a sensor data communication method 551. The method 551 may efficiently communicate sensor data 487 by prioritizing the communication of high-priority data. The method 551 may be embodied in step 519 of FIG. 11A. The method 551 may be performed by one or more processors 405 of the sensors 120 and/or sensor platforms 105, and by the sensor management platform 100, the sensors 120 and/or sensor platforms 105.

The method 551 starts, and in one embodiment, the processor 405 receives 553 given sensor data 487 at a first network node 103. The processor 405 further calculates 557 the priority value 223 for the given sensor data 487. The processor 405 may determine 559 if the priority value 223 exceeds the priority threshold 299. If the priority value 223 does not exceed the priority threshold 299, the processor 405 may later recalculate 557 the priority value 223 for the given sensor data 487.

In response to the priority value 223 exceeding the priority threshold 299, the processor 405 communicates 561 the given sensor data 487 from the first network node 103 to a second network node 103 via a link 195 and the method 551 ends. As a result, only sensor data 487 with a sufficiently high priority value 223 is communicated 561, reducing the traffic on the network 101. Thus, the given sensor data 487 may be held at the first network node 103 until the priority value 223 of the given sensor data 487 is sufficiently high and/or until the network 101 has sufficient free bandwidth.

Figure 11C:
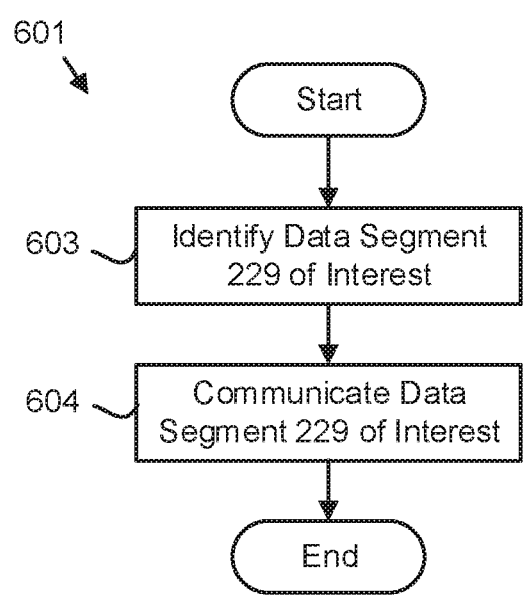
FIG. 11C is a schematic flow chart diagram illustrating one embodiment of a data segment communication method.

FIG. 11C is a schematic flow chart diagram illustrating one embodiment of a data segment communication method 601. The method 601 may identify and communicate data segments 229 of interest. The method 601 may be performed by one or more processors 405 of the sensors 120 and/or sensor platforms 105, and by the sensor management platform 100, the sensors 120 and/or sensor platforms 105.

The method 601 starts, and in one embodiment, the processor 405 identifies 603 a data segment 229 of interest in given sensor data 487. The data segment 229 of interest may be identified 603 in response to the confidence contribution 233 for the data segment 229 exceeding the confidence threshold 293. Alternatively, the data segment 229 of interest may be identified 603 if the confidence contribution 233 for the sensor data 487 exceeds the confidence threshold 293 and the data segment 229 of interest is for an area of interest 262.

The processor 405 further communicates 604 only the data segment of interest 229 to the second network node 103 and the method 601 ends. As a result, the impact on the bandwidth of the network 101 is reduced, decreasing the latency of the network 101 while communicating 604 the needed data of the data segment 229.

The embodiments discover the network topology 203 and dynamically generate one or more minimum spanning trees 107 from the network topology 203. The embodiments further route the sensor task 140 to a sensor 120 and measure the area of interest 262 with the sensor 120. The sensor data 487 from the measurement of the area of interest 262 is efficiently routed via the links 195 of the minimum spanning tree 107. As a result, the sensor data 487 is efficiently and rapidly routed from the sensor 120, improving the efficiency of collecting and processing the sensor data 487 to the processing nodes 160 of the sensor management system 100.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   discovering, by use of a processor, a network topology for a network comprising a plurality of network nodes connected by links;
   dynamically generating a minimum spanning tree from the network topology, wherein given sensor data traverses one link of the minimum spanning tree only once;
   routing a sensor task to a sensor with a sensor motion track that comprises an area of interest;
   measuring the area of interest with the sensor based on the sensor task; and
   routing sensor data from the measurement of the area of interest via links of the minimum spanning tree.

2. The method of claim 1, the method further comprising:
   dynamically organizing a plurality of sensor platforms into platform groups based on location and link data rate; and
   generating the minimum spanning tree for each platform group and for network nodes within each platform group.

3. The method of claim 2, wherein the platform groups are based on geographic proximity.

4. The method of claim 1, the method further comprising:
   receiving the given sensor data at a first network node;
   calculating a priority value for the given sensor data;
   in response to the priority value exceeding a priority threshold, communicating the given sensor data from the first network node to a second network node.

5. The method of claim 4, wherein the priority value is calculated based on a confidence contribution to a mission objective.

6. The method of claim 5, wherein the confidence contribution is calculated as a function of completed mission tasks, node location, and/or node capabilities.

7. The method of claim 6, the method comprising:
   identifying a data segment of interest in given sensor data in response to the confidence contribution for the data segment exceeding the confidence threshold; and
   communicating only the data segment of interest to the second network node.

8. The method of claim 1, wherein the sensor task is routed to the sensor in response to a mission chain.

9. The method of claim 1, wherein the mission chain comprises two or more of a detect trigger, a track trigger, a geolocate trigger, an identify trigger, and/or an inform trigger, and the mission chain further comprises a chain priority.

10. The method of claim 9, wherein each trigger comprises a trigger criteria that determines whether the trigger is satisfied, a successor trigger that is activated in response satisfying the trigger criteria, and a trigger behavior 261 that is initiated in response satisfying the trigger criteria.

11. An apparatus comprising:
   one or more processors;

one or more memories storing code executable by the processors to perform:

discovering a network topology for a network comprising a plurality of network nodes connected by links;

dynamically generating a minimum spanning tree from the network topology, wherein given sensor data traverses one link of the minimum spanning tree only once;

routing a sensor task to a sensor with a sensor motion track that comprises an area of interest;

measuring the area of interest with the sensor based on the sensor task; and routing sensor data from the measurement of the area of interest via links of the minimum spanning tree.

12. The apparatus of claim 11, the one or more processors further:

dynamically organizing a plurality of sensor platforms into platform groups based on location and link data rate; and generating the minimum spanning tree for each platform group and for network nodes within each platform group.

13. The apparatus of claim 12, wherein the platform groups are based on geographic proximity.

14. The apparatus of claim 11, the one or more processors further:

receiving the given sensor data at a first network node;

calculating a priority value for the given sensor data;

in response to the priority value exceeding a priority threshold, communicating the given sensor data from the first network node to a second network node.

15. The apparatus of claim 14, wherein the priority value is calculated based on a confidence contribution to a mission objective.

16. The apparatus of claim 15, wherein the confidence contribution is calculated as a function of completed mission tasks, node location, and/or node capabilities.

17. The apparatus of claim 16, the one or more processors further:

identifying a data segment of interest in given sensor data in response to the confidence contribution for the data segment exceeding the confidence threshold; and communicating only the data segment of interest to the second network node.

18. The apparatus of claim 11, wherein the sensor task is routed to the sensor in response to a mission chain, the mission chain comprises two or more of a detect trigger, a track trigger, a geolocate trigger, an identify trigger, and/or an inform trigger, and the mission chain further comprises a chain priority, and each trigger comprises a trigger criteria that determines whether the trigger is satisfied, a successor trigger that is activated in response satisfying the trigger criteria, and a trigger behavior 261 that is initiated in response satisfying the trigger criteria.

19. The apparatus of claim 11, wherein at least one link of the minimum spanning tree is an acoustic communication link.

20. A computer program product comprising one or more non-transitory storage medium storing code executable by one or more processors to perform:

discovering a network topology for a network comprising a plurality of network nodes connected by links;

dynamically generating a minimum spanning tree from the network topology, wherein given sensor data traverses one link of the minimum spanning tree only once;

routing a sensor task to a sensor with a sensor motion track that comprises an area of interest;

measuring the area of interest with the sensor based on the sensor task; and routing sensor data from the measurement of the area of interest via links of the minimum spanning tree.

* * * * *